United States Patent
BaderEddin et al.

(10) Patent No.: US 11,392,970 B2
(45) Date of Patent: Jul. 19, 2022

(54) ADMINISTERING A DIGITAL SURVEY OVER VOICE-CAPABLE DEVICES

(71) Applicant: QUALTRICS, LLC, Provo, UT (US)

(72) Inventors: Ali BaderEddin, Kenmore, WA (US);
Hongyi Gao, South Jordan, UT (US);
Mark Chen-Young Wu, Seattle, WA (US); Ali Hyder, Sammamish, WA (US); Jeffrey Angell, Everett, WA (US);
Kyle Seely, Springville, UT (US);
Cameron Holiman, Orem, UT (US);
Micah Arvey, Seattle, WA (US);
Aravind Aluri, Sammamish, WA (US);
Anderson Quach, Seattle, WA (US);
Ben Alton, Orem, UT (US)

(73) Assignee: Qualtrics, LLC, Provo, UT (US)

( * ) Notice: Subject to any disclaimer, the term of this patent is extended or adjusted under 35 U.S.C. 154(b) by 586 days.

(21) Appl. No.: 15/620,462

(22) Filed: Jun. 12, 2017

(65) Prior Publication Data
US 2018/0232752 A1 Aug. 16, 2018

Related U.S. Application Data

(60) Provisional application No. 62/459,146, filed on Feb. 15, 2017.

(51) Int. Cl.
*G06Q 30/02* (2012.01)
*G10L 13/08* (2013.01)
*G10L 15/22* (2006.01)

(52) U.S. Cl.
CPC .......... *G06Q 30/0203* (2013.01); *G10L 13/08* (2013.01); *G10L 15/22* (2013.01)

(58) Field of Classification Search
CPC ... G10L 2015/088; G10L 25/51; G10L 13/08; G10L 15/22; G10L 15/18;
(Continued)

(56) References Cited

U.S. PATENT DOCUMENTS 6,766,320 B1 7/2004 Wang et al.
9,183,563 B2 11/2015 Basir
(Continued)

FOREIGN PATENT DOCUMENTS

JP 4096570 B2 6/2008
WO WO 01-67329 A1 9/2001
WO WO 2018/151781 A1 8/2018

OTHER PUBLICATIONS

International Search Report & Written Opinion as received in PCTUS2017-062314 dated Mar. 13, 2018.
(Continued)

*Primary Examiner* — Marcos L Torres
(74) *Attorney, Agent, or Firm* — Keller Preece PLLC

(57) ABSTRACT

The present disclosure is directed toward systems and methods for managing a digital survey over voice-capable devices. In particular, the systems and methods described herein create a digital survey question from a verbal input. Additionally, the systems and methods described herein provide the digital survey question to respondents by way of voice-capable devices. The systems and methods also receive verbal survey responses, generate survey results from the verbal responses, and provide the survey results to a survey administrator.

20 Claims, 13 Drawing Sheets

(58) Field of Classification Search
CPC .......... G06Q 30/0203; H04M 2201/40; H04M 2203/1041; H04M 3/563
See application file for complete search history.

(56) References Cited

U.S. PATENT DOCUMENTS

| | | |
|---|---|---|
| 2007/0291926 A1 | 12/2007 | Anderson |
| 2011/0137709 A1* | 6/2011 | Meyer .................... G06Q 10/00 705/7.32 |
| 2015/0206156 A1 | 7/2015 | Tryfon et al. |
| 2016/0246947 A1 | 8/2016 | Yao |
| 2016/0335399 A1* | 11/2016 | Vancho ................. G06F 19/328 |

OTHER PUBLICATIONS

Office Action as received in European Application 17897014.1 dated Nov. 4, 2021.
Extended European Search Report as received in European application 17897014.1 dated Jul. 1, 2020.

* cited by examiner

ADMINISTERING A DIGITAL SURVEY OVER VOICE-CAPABLE DEVICES

CROSS-REFERENCE TO RELATED APPLICATION(S)

This application claims priority to U.S. Provisional Patent Application No. 62/459,146 filed Feb. 15, 2017, the disclosure of which is incorporated in its entirety by reference herein.

BACKGROUND

Individuals and businesses alike are increasingly using online digital surveys to gather information. Companies, institutions, and others use online digital surveys to gather customer service feedback, customer satisfaction ratings, or other information from clients, employees, or others. Unfortunately, conventional online digital survey systems have inherent deficiencies. For example, many conventional online digital survey systems distribute digital surveys that often result in a sterile or impersonal user experience for a survey participant. Due to the impersonal user experience, many survey participants reject an opportunity to participate in a digital survey or quit the digital survey prior to completion. Accordingly, conventional online digital survey systems often provide digital surveys that suffer from lower participation rates and/or lower completion rates than desired by survey administrators.

For example, conventional systems create an unengaging user experience that often does not provide a natural system-user interaction. When distributing a digital survey, conventional systems generally present a number of survey questions on a display of an electronic device (e.g., a computer, a smartphone, a tablet, etc.). The survey participant then navigates through questions one after another within a graphical user interface by providing one interaction to provide an answer to a question, and then providing another interaction to go to the next question. This process is often repeated multiple times depending on the number of questions in a digital survey, extending the amount of time to take a digital survey and often causing frustration for survey participants. By utilizing this more rigid structure, conventional systems often provide an unengaging user experience.

As another example, conventional systems dissuade individuals from utilizing surveys to informally gather quick information because conventional systems generally often provide a digital survey creation process that is time-consuming and complex. Indeed, many conventional system offer powerful digital survey tools and options, but often a trained survey administrator is needed to create an effective survey. As such, conventional systems make it difficult for an individual to take informal straw polls, quickly gather information from an audience on the spot, or send out a digital survey in an intuitive and time-efficient process.

Additionally, conventional systems often provide digital surveys having text-based question-and-answer format. A text-based format of conventional systems, however, are ineffective at capturing on-the-spot consumer reactions. In particular, because conventional systems often use a text-based format, conventional systems usually distribute digital surveys through text-based channels (e.g., email or website). Due to the nature of text-based channels, there is often a significant delay between a survey participant experiencing an event pertaining to a digital survey and receiving an opportunity to take the digital survey. Conventional systems thereby miss out on more candid participant responses.

Thus, there are several disadvantages with regard to conventional online digital survey systems.

SUMMARY

One or more embodiments described herein provide benefits and solve one or more of the foregoing or other problems in the art with systems and methods for administering and managing a digital survey by way of voice-capable devices. In particular, the systems and methods described herein generate natural language survey questions and distribute the natural language survey questions to respondents (e.g., survey participants) by way of voice-capable devices. Additionally, the systems and methods described herein receive transcriptions of verbal responses spoken by survey respondents, and analyze the verbal response transcriptions to generate survey results. Further, the systems and methods described herein provide a surveyor (e.g., a survey administrator the survey results, and in some instances, the systems and methods provide the survey results to the surveyor within audio reports that are sent to and played by voice-capable devices.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
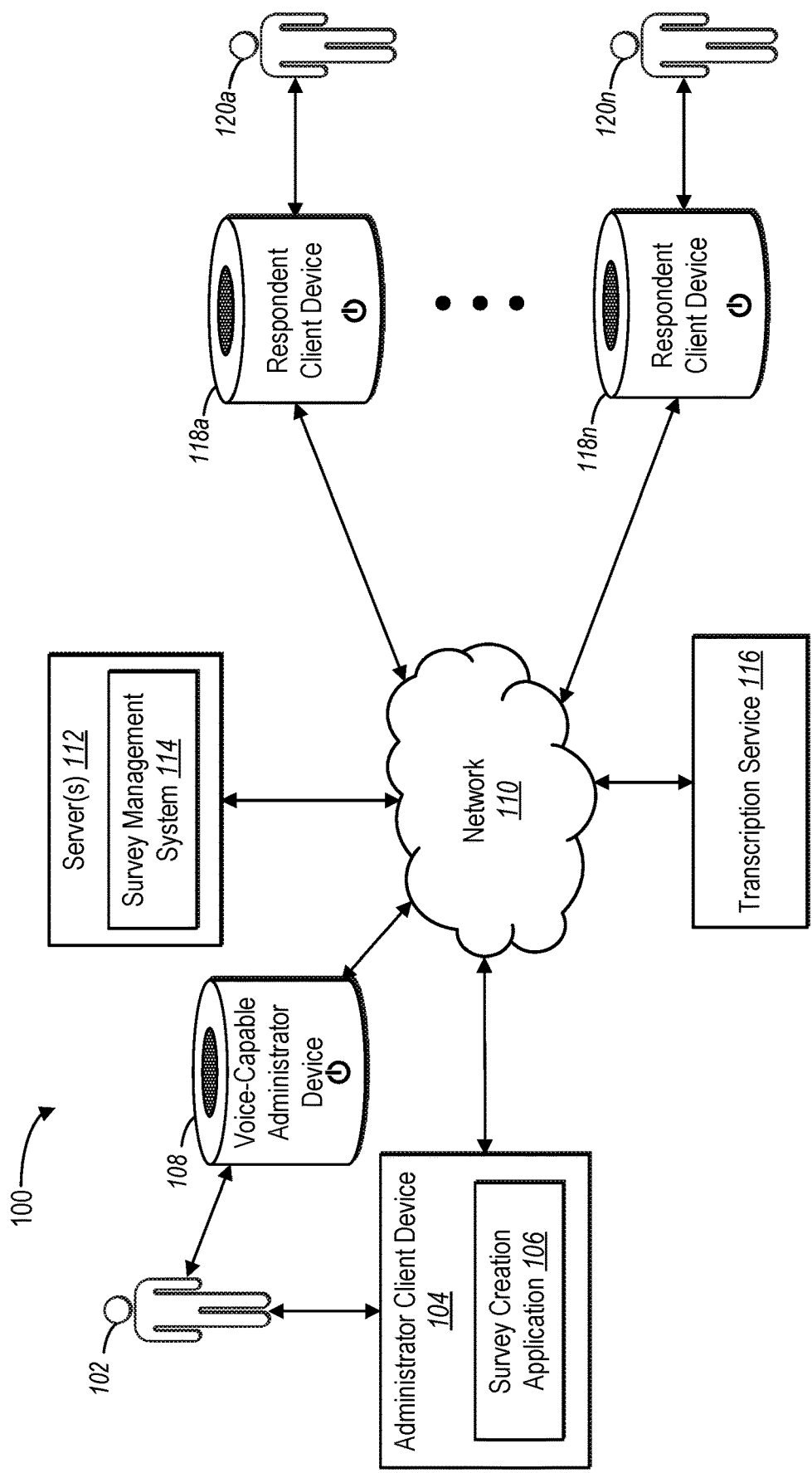
FIG. 1 illustrates a schematic diagram of an example environment of a survey management system in accordance with one or more embodiments.

One or more embodiments described herein provide benefits and solve one or more of the foregoing or other problems in the art with a survey management system that administers and manages a digital survey using voice-capable devices. In one or more embodiments, the survey management system generates a text-based natural language survey question. In addition, the survey management system causes a transcription service to convert the text-based natural language survey question into an audio question to distribute to a voice-capable device associated with a survey respondent (e.g., a survey participant). In turn, the voice-capable device captures a verbal response to the audio question from the survey respondent and sends the verbal response to the transcription service that generates a transcription of the verbal response.

Furthermore, in some embodiments, the survey management system receives and analyzes the transcription of the verbal response of the respondent. Based on the analysis of the transcription of the verbal response, the survey management system generates a survey result to the survey question. In some embodiments, the survey management system uses the analysis of the transcription of the verbal response to select the survey result from multiple predefined potential survey results (e.g., an answer to a multiple-choice question). Furthermore, the survey management system provides the survey results to a survey administrator. In one or more embodiments, the survey management system provides the survey administer an audio report that includes the survey result.

To ultimately provide an audio question to a respondent, the survey management system first creates a digital survey question. In some embodiments, the survey management system creates a digital survey question in response to receiving a verbal survey creation instruction that a survey administrator provides to a voice-capable client device, such as a smartphone, a smart home device, a smart appliance. In these embodiments, the verbal survey creation instruction can include a vocalized question and/or additional survey instructions (e.g., question type, answer options, target respondent attributes). The voice-capable client device sends an audio file that includes the verbal survey creation instruction to the survey management system through a transcription service that transcribes the verbal survey creation instruction into text. In at least some embodiments, the transcription service is a third-party service that is external from the survey management system, while in other embodiments the transcription service is integrated within the survey management system.

Next, the survey management system receives the transcription of the verbal survey creation instruction (e.g., a verbal question) from the voice transcription service. To create a digital survey question, the survey management system analyzes the transcription of the verbal survey creation instruction to generate the digital survey question. In addition, based on the analysis of the transcription of the verbal survey creation instruction, the survey management system generates and/or identifies survey attributes (e.g., a survey identifier, a question identifier, a question type, an answer format, a target audience) to associate with the digital survey question. Further detail regarding the creation of a digital survey and/or a digital survey question from a verbally spoken survey question is provided below with reference to FIG. 7.

In addition to creating a digital survey question from a verbal survey creation instruction, the survey management system administers the digital survey question to a respondent by causing a presentation of an audio question to the respondent, and a collection of a verbal response from the respondent. For example, the survey management system distributes a digital survey question to a respondent as an audio survey question by way of a voice-capable device associated with the respondent. Additionally, after the voice-capable device presents the audio survey question to the respondent, the voice-capable device captures a verbal response to the question.

In one or more embodiments, to provide an intuitive and effective audio survey question, the survey management system modifies a digital survey question to generate a text-based natural language survey question. Many times, an "original" digital survey question includes various characteristics that do not have a lot of meaning or would be confusing if directly converted into audio form. For example, a digital survey question may be a multiple-choice question type and include a question portion of: "Please select the product you purchased from Company." As answer choices, the digital survey question may also include a list of ten (10) products meant for presentation as a selectable list. In the event the survey management system presents this digital survey question within a graphical user interface, the language combined with the list of products is effective. However, presenting the question and list verbatim in an audio survey question would result in a cumbersome and confusing audio survey question.

To solve the problems associated with providing a verbatim digital survey question within an audio question, the survey management system converts the digital survey question to a text-based natural survey question. For instance, the survey management system analyzes the digital survey question to identify elements of the digital survey question (e.g., words or phrases) that correspond to natural spoken language, as well as to identify survey question attributes. Using the words, phrases and/or the survey question attributes (e.g., question type, answer format), the survey management system generates the text-based natural language survey question.

For example, the case of the example digital survey question discussed in the above paragraph, the survey management system may modify the original question of "Please select the product you purchased from Company" to "What product did you purchase from Company?" The respondent could then say the name of the product the respondent purchased, and as will be discussed in detail below, the survey management system can analyze the response to match the response to one of the products in the list of products. In other words, the survey management system modifies a digital survey question to a text-based natural language survey question that, if read aloud, would prompt a respondent to respond in a meaningful way. With some digital survey questions, however, no modification to a text-based natural language survey is needed (e.g., with an open-ended question of: "Tell us about your experience with Product X.")

The survey management system further causes a transcription service to convert the text-based natural language survey question (or simply the digital survey question) into an audio survey question. In particular, the survey management system sends the text-based natural language survey question to the voice transcription service, which converts the text-based natural language survey question into an audio survey question to provide to a respondent by way of a voice-capable device. For example, the survey management system provides the text-based natural language survey question and a respondent identifier (e.g., a device identifier associated with the respondent) to the transcription service, which in turn, causes the transcription service to convert (e.g., synthesize) the natural language survey question into an audio survey question, and provide the audio survey question (e.g., via audio streaming or sending an audio file) to the voice-capable device associated the respondent identifier. Additional detail regarding the distribution of the text-based natural language survey question as an audio survey question or otherwise is provided below with reference to FIG. 2 and FIG. 6.

In addition to the survey management system causing a voice-capable device to provide an audio survey question to a respondent, the survey management system further causes the voice-capable device to collect a verbal response from the respondent. In one or more embodiments, the survey management system causes the voice-capable device to send the verbal response to the transcription service, which transcribes the verbal response. Accordingly, the survey management system receives a text transcription of a verbal response given (e.g., spoken, vocalized) by the respondent and captured by the voice-capable device.

Upon receiving the transcription of the verbal response, the survey management system analyzes the transcription to generate a survey result for the digital survey question. In particular, the survey management system implements a natural language processing technique to analyze the transcription of the verbal response. From this analysis, the survey management system identifies one or more key phrases within the transcription of the verbal response and correlates the identified key phrases with a particular survey result. In other words, the survey management system extrapolates, from the identified key phrases of the transcription of the verbal response, an appropriate survey response that corresponds to the identified key phrase.

For example, for a slider survey question that uses a scale from 0-10 (10 being most pleased) as a rating metric for evaluating Company Q, the survey management system associates certain phrases from the transcription of the verbal response (e.g., "I really liked Company Q. I would very likely recommend them.") with corresponding survey responses from among many possible survey responses (e.g., 0, 1, 2, . . . , 10). From this example, the survey management system may identify "really liked" and "very likely recommend" as two positive phrases that, together with "Company Q," indicate that the respondent was extremely pleased with Company Q. As such, the survey management system would extrapolate that a 10 would be the survey response commensurate with the words used in the verbal response as indicated by the identified key phrases.

Additionally, the survey management system provides the survey result to the administrator. In at least one embodiment, the survey management system provides the survey results to a survey administrator by displaying, within a GUI on an administrator client device, a graphical (e.g., text-based, image-based, etc.) display of the survey results. In at least one other embodiment, the survey management system provides the survey results to a survey administrator by audibly presenting an audio result by way of a voice-capable client device associated with the survey administrator. In such a case, the survey management system can send the survey results to the transcription service to cause the transcription service to convert the survey results into an audio result, as will be described further below.

Accordingly, the survey management system provides a more engaging user experience for both a survey administrator as well as for a survey respondent. Particularly, the survey management system creates a more natural, conversational digital survey by generating naturally-phrased survey questions and then distributing those survey questions to respondents by way of voice-capable devices.

From the perspective of a survey administrator (e.g., an individual or other entity who creates and/or manages a digital survey), the survey management system provides an easier survey creation technique. By enabling a survey administrator to vocalize a question directed to a voice-capable device, the survey management system allows a survey administrator to more easily and more quickly create a digital survey. The survey administrator need not access a conventional survey creation interface on an electronic device, but instead need only speak a survey creation instruction and/or ask a survey question to a voice-capable device to create a digital survey, thereby enabling a faster, easier survey creation technique.

From the perspective of a survey respondent, the survey management system enables a survey respondent to more candidly respond to survey questions. In particular, by providing survey questions to respondents by way of voice-capable devices, and by receiving survey responses as verbal responses captured by voice-capable devices, the survey management system enables respondents to answer on-the-spot questions, respond to questions in a natural conversational format, and avoid conventional navigation to and within a survey graphical interface. In this way, the survey management system gathers more candid, honest, and accurate responses. For example, the survey management system may gather customer feedback from a rental car equipped with a voice-capable device upon a customer sitting in the vehicle (e.g., by asking, by way of a speaker on a voice-capable device, "How do you like the car?"). Conventional survey systems are not capable of providing such on-the-spot surveys.

Furthermore, the survey management system is a more efficient than conventional survey systems, and thus the survey management system can gather a higher percentage of responses to a give digital survey question to generate more robust survey results. Whereas conventional systems often miss out on potential respondents who do not take the time to seek out a digital survey to provide feedback, the survey management system described herein more effectively reaches out to those potential respondents by way of voice-capable devices. Moreover, the survey management system uses conversational question-and-answer techniques to encourage respondents who might otherwise be disinclined to participate in a digital survey to provide feedback. Thus, the survey management system described herein gathers responses from a wider range of respondents and generates more robust results from a larger, and therefore more accurate, response data set.

Additionally, the survey management system has a much broader range of application. By using voice-capable devices, the survey management system can distribute survey questions into areas that were previously inaccessible. For example, the survey management system can distribute audio survey questions over voice-capable devices ranging from smart dishwashers to voice-capable devices in rental cars, hotel rooms, etc. In this way, the survey management system gathers new information and generates meaningful survey results about new subjects, events, customer experiences, precise impressions, and other information conventional systems are unable to gather.

Furthermore, the survey management system described herein improves a computer system by increasing the efficiency of computer processing and computer memory usage compared to conventional survey systems. Particularly, whereas conventional systems require multiple survey databases for distributing surveys across multiple formats and/or multiple platforms, the survey management system described herein utilizes a single survey database. For example, instead of needing a web-based survey platform and database for digital surveys distributed over a web interface, and a second mobile platform and database for digital surveys distributed over a mobile interface, and a third platform and databased for distributing audio surveys over voice-capable devices, the survey management system described herein utilizes a single platform and survey database across any distribution format.

For example, by using a single survey database, the survey management system requires less memory than conventional systems. The survey management system uses a cross-platform survey database to distribute digital surveys over the web, mobile devices, voice-capable devices, etc., and therefore stores less information than conventional systems that require a database for each platform (e.g., one for web, one for mobile, etc.). Thus, the survey management system provides improved memory functionality over conventional systems in implementing a digital survey over voice-capable devices.

In addition, because the survey management system uses a single survey database, the survey management system also requires less processing power. Whereas conventional systems query multiple databases to distribute a digital survey across multiple platforms, the survey management system described herein queries a single survey database. Thus, the survey management system performs fewer operations when distributing a digital survey and when collecting survey responses and generating survey results. By performing fewer operations, the survey management system described herein also consumes less power.

More detail regarding the survey management system will now be provided with reference to the figures. In particular, FIG. 1 illustrates a schematic diagram of an example survey environment 100 for implementing a survey management system 114 in accordance with one or more embodiments. An overview of the survey management system 114 and the environment 100 is described in relation to FIG. 1. Thereafter, a more detailed description of the components and processes of the survey management system 114 is provided in relation to the subsequent figures.

As illustrated by FIG. 1, the survey environment 100 includes an administrator client device 104 associated with an administrator 102 (e.g., a survey administrator). The survey environment 100 also includes one or more respondent client devices 118a-118n (collectively referred to herein as "respondent client devices 118") associated with respondents 120a-120n (collectively referred to herein as "respondents 120"). As shown in FIG. 1, respondent client device 118a is associated with respondent 120a, and respondent client device 118n is associated with respondent client device 120n. As further shown in FIG. 1, the respondent client devices 118 and the administrator client device 104 communicate with server(s) 112 via network 110.

As further illustrated in FIG. 1, server(s) 112 can implement the survey management system 114 and/or one or more services thereof. In one or more embodiments, the administrator client device 104 and the respondent client devices 118 may directly communicate with the server(s) 112, bypassing network 110. For example, the survey management system 114 implemented on server(s) 112 may communicate directly with the administrator client device 104, or indirectly via network 110, to receive, from the administrator client device 104, a digital survey question. Likewise, the survey management system 114 communicates, either directly or by way of network 110, with respondent client devices 118 to distribute the digital survey question and to receive responses to the digital survey question.

As used herein, a survey administrator (e.g., "administrator") refers to an individual, a group of individuals, a company, a corporation, or other entity that creates and manages a digital survey by way of a survey creation application on an electronic device. For example, an administrator creates, by way of a survey creation application on an administrator client device, a digital survey intended for a target audience of respondents with the aim of receiving customer satisfaction ratings and feedback. As another example, an administrator refers to an individual or other entity (e.g., as described above) that creates and/or manages a digital survey by way of a voice-capable administrator device. In this example, the administrator creates a digital survey by speaking (e.g., vocalizing) a question motivated by a given purpose (e.g., to take a poll, to collect information relating to a particular topic, or simply out of curiosity) to a voice-capable administrator device.

As also used herein, the term respondent refers to an individual, group of individuals, or other entity that responds to one or more digital survey questions as part of a digital survey. Such responses include, but are not limited to, a selection of an option from within a set of options (e.g., a set of answer choices) associated with a multiple-choice question, an open-ended text input response, a selection of a rating on a slider bar, etc. A respondent may provide a response by way of an electronic device (e.g., a respondent client device), including a voice-capable device as mentioned above and discussed in further detail below.

As also shown in FIG. 1, the survey environment 100 includes a voice-capable administrator device 108 associated with the administrator 102. The administrator 102 creates, by way of the administrator client device 104 running survey creation application 106 and/or by way of voice-capable administrator device 108, a digital survey for distribution to respondents 120. Although FIG. 1 depicts the survey management system 114 implemented across a survey environment 100, including multiple respondent client devices 118 and an administrator client device 104, it will be understood that this is exemplary and that the survey management system 114 may, in at least one embodiment, be implemented across a communications system including electronic devices running digital survey applications (e.g., via a web interface or via a mobile interface) suitable for managing digital survey applications including voice-capable features.

As illustrated in FIG. 1, the survey environment 100 further includes a transcription service 116. As used herein, a transcription service (e.g., a voice transcription service) refers to either a third-party service or a service implemented as a component of the survey management system 114 that converts text to speech and that also converts speech to text. A voice transcription service can utilize a speech-to-text algorithm to transcribe voice input into a text-based output. Similarly, the transcription service can also utilize a text-to-speech algorithm to convert text input into an audio-based output. Furthermore, a transcription service can include a service located at a server external from server(s) 112 (e.g., a third-party server).

The survey management system 114 on server(s) 112 may communicate with the transcription service 116 and vice versa either directly or by way of network 110. The survey management system 114 communicates with the transcription service 116 to convert text-based digital survey questions into audio survey questions, and further communicates with the transcription service 116 to transcribe verbal survey responses into text-based responses. For example, survey management system 114 communicates with the transcription service 116 to convert a text-based digital survey question into an audio survey question and to provide the audio survey question to respondent client devices 118 (e.g., by way of network 110).

Although FIG. 1 depicts survey management system 114 located on server(s) 112, it will be understood that in one or more embodiments, the survey management system 114 may be implemented across the survey environment 100, including administrator client device 104, voice-capable administrator device 108, transcription service 116, server(s) 112, and/or respondent client devices 118. Indeed, the survey management system 114 may be located entirely or in part on server(s) 112, administrator client device 104, voice-capable administrator device 108, and/or respondent client devices 118.

As further illustrated in FIG. 1, the survey environment 100 includes any potential number of respondents 120 associated with respondent client devices 118. For discussion purposes, it will be beneficial to explain the operations and processes of the survey management system 114 with reference to a single respondent client device (e.g., respondent client device 118*a*) associated with a single respondent 120*a*. It will be understood, however, that the survey management system 114 communicates and performs the various processes described herein with any number of respondent client devices 118 within the survey environment 100.

The administrator client device 104, the voice-capable administrator device 108, and the respondent client devices 118 can be one or more of various types of computing devices. For example, each of the administrator client device 104, the voice-capable administrator device 108, and the respondent client devices 118 may be a mobile device such as a smartphone, PDA, tablet, laptop, or another computing device. Additionally or alternatively, the voice-capable administrator device 108, and the respondent client devices 118 may include a non-mobile device such as a desktop computer or other type of non-mobile computing device as explained further below with reference to FIG. 10. In addition, the administrator client device 104, the voice-capable administrator device 108, and/or the respondent client devices 118 can include the same type of functionality, but need not be the same type of device.

Furthermore, as shown in FIG. 1, voice-capable administrator device 108 and respondent client devices 118 can be voice-capable devices. As used herein, a voice-capable device refers to a device including a speaker or other hardware component capable of audibly providing (e.g., playing) an audio survey question. Furthermore, a voice-capable device refers to a device that also includes a microphone or other hardware component capable of capturing verbal instructions and/or responses spoken by a user (e.g., a survey administrator or a respondent). Such devices can include, but are not limited to, a smartphone, a computer, a tablet, a smart appliance (e.g., a smart washing machine, a smart refrigerator), an entertainment system, a gaming system, a smart home device (e.g., AMAZON ECHO or GOOGLE HOME), etc.

The administrator client device 104, as shown in FIG. 1, includes a survey creation application 106. The survey creation application 106 may, in some embodiments, communicate with the voice-capable administrator device 108 (e.g., via network 110) to create a digital survey either from verbal survey creation instructions by the administrator 102 that are received by the voice-capable administrator device 108, or else from more conventional digital survey creation instructions entered by a keyboard, touchscreen, or other interface associated with the administrator client device 104. In at least one embodiment, the voice-capable administrator device 108 communicates with the transcription service 116 and/or the administrator client device 104 to relay (e.g., transmit) verbal survey questions and/or verbal survey creation instructions to the transcription service 116, whereupon the transcription service 116 transcribes (e.g., converts to text) the verbal instructions. Additionally, the transcription service 116 communicates with the administrator client device 104 to create a digital survey in accordance with the received verbal instructions. In at least one other embodiment, the voice-capable administrator device 108 need not communicate with the administrator client device 104 to create a digital survey, but may instead create the digital survey itself in response to receiving verbal instructions from the administrator 102.

As will be described in more detail below with reference to FIGS. 2-8, the components of the survey management system 114 can manage, along and/or in combination with other components of the survey environment 100, a digital survey by way of voice-capable devices. In particular, the survey management system 114 can receive verbal survey creation instructions and/or verbal survey questions to create a digital survey. The survey management system 114 can further distribute the digital survey to respondents by utilizing a voice transcription service (e.g., transcription service 116) to deliver the survey questions to respondents 120 by way of voice-capable devices such as respondent client devices 118. Furthermore, as will be described in relation to FIGS. 2-8, the survey management system 114 receives verbal responses to survey questions, processes the verbal responses (e.g., by way of a voice transcription service and/or natural language processing techniques), and generates survey results based on the responses. The survey management system 114 also can report survey results to the survey administrator 102.

In one or more embodiments, the survey management system 114 maintains an administrator account (e.g., a paid account, a subscription account) associated with the administrator 102. For instance, the survey management system 114 may require the administrator 102 to pay a particular amount per response received or per target respondent (e.g., respondent 120*a*) intended for distribution of a survey question. Additionally or alternatively, the survey management system 114 requires payment from the administrator 102 to distribute a digital survey question and/or to receive information (e.g., results) related to a digital survey. In these or other embodiments, the survey management system 114 requires payment in the form of currency (e.g., money), while in still other embodiments the survey management system 114 requires payment in the form of information. For example, in these embodiments, the survey management system 114 requires the administrator 102 to answer one or more questions related to other digital surveys and/or provide other information in exchange for the survey management system 114 administering a digital survey on behalf of the administrator 102.

As indicated above, the survey management system 114 can communicate with one or more respondent client devices (e.g., respondent client device 118a) as well as the administrator client device 104 and the voice-capable administrator device 108 via the network 110. The network 110 may include one or more networks and may use one or more communication platforms, protocols, or technologies suitable for transmitting data and/or communication signals, as further described below with reference to FIGS. 12 and 13.

Moreover, although FIG. 1 illustrates a particular arrangement of the server(s) 112, the administrator client device 104, the voice-capable administrator device 108, the respondent client devices 118, and the transcription service 116, various additional or alternative arrangements are possible. For example, in at least one embodiment, the transcription service 116 may be a component of (e.g., configured within) the survey management system 114.

Generally speaking, the survey management system 114 facilitates the creation, distribution, and management of a digital survey. As used herein, a digital survey (or sometimes referred to herein as a "survey") refers to a set of digital survey questions intended for distribution over a network by way of electronic devices (e.g., smart home devices, computers, smartphones, tablets), and further intended to collect responses to the digital survey questions for generating survey results from the collected responses. A digital survey can include one or more digital survey questions and corresponding answer choices that accompany the given question.

As used herein, a "digital survey question" refers to a prompt included in a digital survey that invokes a response from a respondent, or that requests information from a respondent. Example types of questions include, but are not limited to, multiple choice, slider, open-ended, ranking, scoring, summation, demographic, dichotomous, differential, cumulative, dropdown, matrix, net promoter score (NPS), singe textbox, heat map, and any other type of prompt that can invoke a response from a respondent. In one or more embodiments, when one or more answer choices are available for a digital survey question, a digital survey question may include a question portion as well as an available answer choice portion that corresponds to the survey question. For example, when describing a multiple choice survey question, the term survey question may include both the question itself as well as the multiple choice answers associated with the multiple-choice question.

As used herein, a "survey response" refers to any type of electronic data representing a response provided to a digital survey question. Depending on the question type, the response may include, but is not limited to, a selection, a text input, an indication of an answer, an actual answer, and/or an attachment. For example, a response to a multiple-choice question may include a selection of one of the available answer choices associated with the multiple-choice question. As another example, a response may include a numerical value, letter, or symbol that that corresponds to an available answer choice. In some cases, a response may include a numerical value that is the actual answer to a corresponding survey question. In addition, a survey response may include other information associated thereto such as, for example, geographical information pertaining to the location of the respondent, a device ID associated with the device by which the respondent responds to the digital survey question, or other metadata associated with respondent/user input.

As used herein, a "survey result" or the term "survey results" refers to a representation of information acquired from a survey response. A survey result can include a simplified representation of a sentiment, opinion, or other information expressed by a respondent in a survey response. In particular, survey results can refer to a report of customer feedback ratings or a summary of poll results based on extracting or otherwise synthesizing quantitative or qualitative information from a received survey response.

As an example, a survey result may be a positive or negative indication of whether a respondent has seen a particular movie. To illustrate, an administrator may ask a survey question that queries the survey management system 114 for a total number of individuals within a neighborhood that have seen BATMAN using the phrasing, "How many people in my neighborhood have seen BATMAN?" To gather the requested survey results, the survey management system 114 may generate and distribute the digital survey question, "Have you seen BATMAN" throughout a geographical area defined as the neighborhood of the particular survey administrator. The survey management system 114 receives a response from a respondent 120a in the affirmative (e.g., "yes") or the negative (e.g., "no") and generates a survey result based on the received response to. The survey management system 114 associates the survey result generated based on the response from respondent 120a with respondent 120a as well as with the given survey question.

Additionally, the survey management system 114 can distribute a digital survey using various possible distribution channels. For example, the survey management system 114 can distribute a digital survey over the Internet to respondent client devices 118. In another embodiment, the survey management system 114 can distribute a digital survey over an Intranet or other closed or isolated network. For example, the survey management system can distribute a digital survey to respondents using a closed network of voice-capable devices within hotel rooms, rental cars, or restaurants. Accordingly, the survey management system 114 can distribute a digital survey over one or more distribution channels.

Although the discussion herein is primarily directed to creating and distributing a digital survey based on verbal input, and likewise gathering verbal responses to generate survey results, it will be understood based on this disclosure that the survey management system 114 accesses a previously created digital survey that the survey management system 114 in response to receiving a verbal instruction from a survey administrator. In particular, in these or other embodiments, the survey management system 114 distributes a previously created digital survey that matches a verbal instruction from an administrator 102. Accordingly, the survey management system 114 can not only create a new digital survey in direct response to receiving verbal instructions, but the survey management system 114 can also access and distribute a previously generated digital surveys or digital survey question regardless of how the survey management system 114 created the previous digital survey or digital survey question. Similarly, the survey management system 114 can report survey results of a previously administered digital survey in response to verbal instructions regardless of how the survey management system 114 generated the digital survey or how the survey management system 114 administered the digital survey (e.g., via email, web interface, or other electronic communication means).

Figure 2:
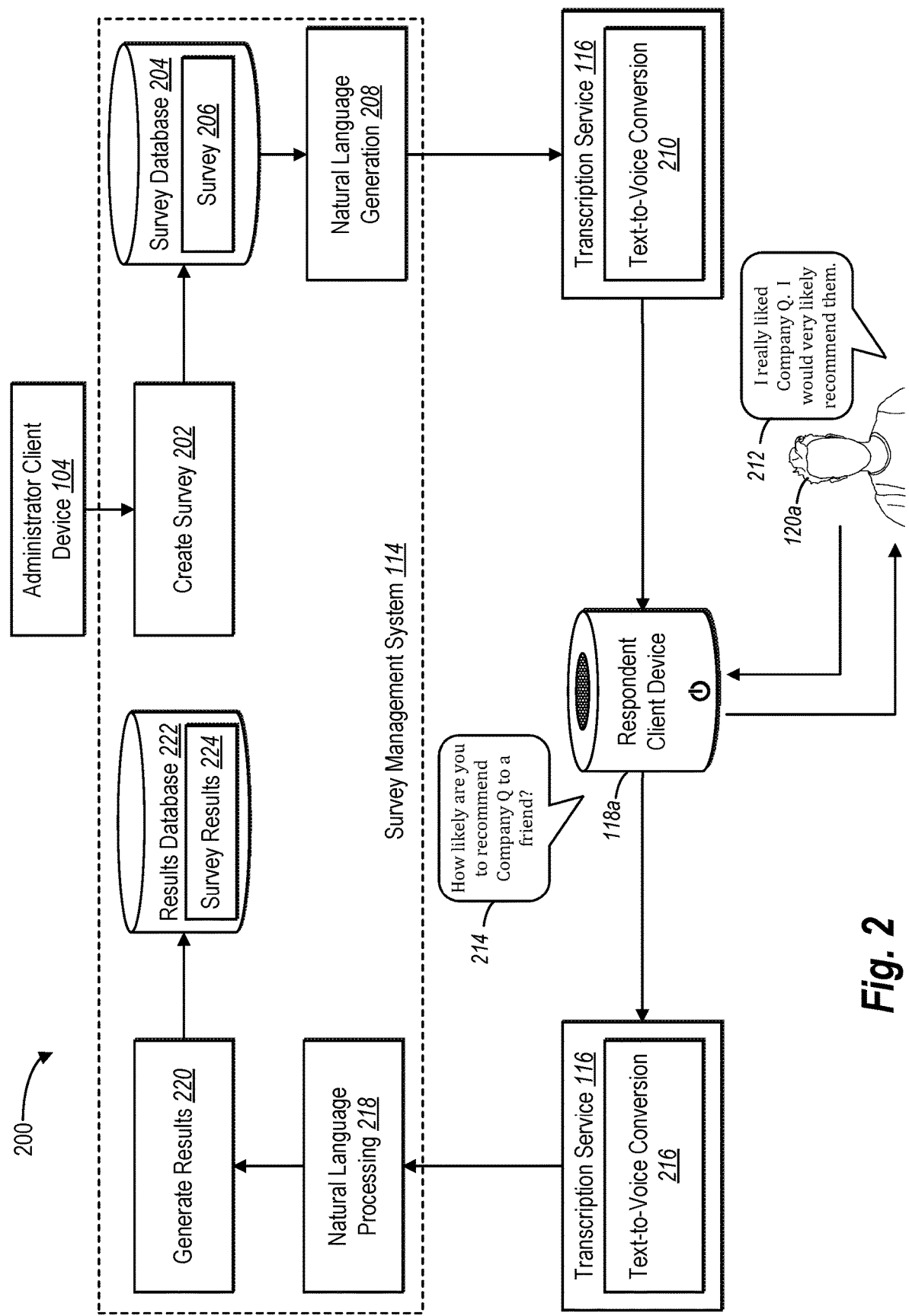
FIG. 2 illustrates a schematic diagram for generating and distributing a digital survey question in accordance with one or more embodiments.

Referring now to FIG. 2, a schematic diagram of the survey management system 114 is shown. The schematic 200 includes a number of acts as well as a number of components in an example embodiment of administering a digital survey by way of voice-capable devices. The acts illustrated in FIG. 2 are performed by the administrator client device 104, the survey management system 114, a voice transcription service (e.g., transcription service 116), and/or a respondent client device 118a. As shown, FIG. 2 includes the administrator client device 104, the survey management system 114 including a survey database 204 and a results database 222, as well as the respondent client device 118a associated with respondent 120a.

In one or more embodiments, as illustrated in FIG. 2, the survey management system 114 communicates with the administrator client device 104 to create a digital survey, as depicted in act 202. In particular, the survey management system 114 creates a digital survey according to survey creation instructions received from the administrator client device 104. Additionally, while FIG. 2 depicts the survey management system 114 communicating with the administrator client device 104 to receive survey creation instructions and thereby create a digital survey (e.g., act 202), in at least one embodiment, the survey management system 114 may interact with the voice-capable administrator device 108 to receive survey creation instructions. Moreover, the survey management system 114 may further interact with a voice transcription service (e.g., transcription service 116) to receive a transcription (e.g., a text-based version) of verbal survey creation instructions spoken by the administrator 102 and captured by the voice-capable administrator device 108.

As used herein, survey creation instructions may refer to a survey question, a set of survey questions, survey attributes, survey question attributes, target respondents, or other information pertaining to a digital survey. As will be discussed below, survey creation instructions can include digital, verbal, text-based, or other formats intended to indicate or trigger the survey management system 114 to create a digital survey.

In one or more other embodiments, the survey management system 114 receives survey creation instructions as a text transcription of a verbal survey creation instruction transcribed by the transcription service 209. In these embodiments, the voice-capable administrator device 108 captures, using a microphone or other audio-capturing hardware component, the verbal survey creation instructions as spoken by the administrator 102. Upon capturing the verbal survey creation instructions, the survey management system 114 curates a corresponding digital survey question. For example, the survey management system 114 receives a text transcription from the transcription service 209 of a verbal survey question within the verbal survey instructions. Additional detail regarding creating a survey in response to receiving a transcription of verbal survey creation instructions is provided below with regard to FIG. 7.

Returning to FIG. 2, as shown in act 202, the survey management system 114 creates a digital survey according to the received survey creation instructions. In particular, the survey management system 114 creates a digital survey 206, and stores the digital survey 206 within survey database 204. The process of creating a digital survey based on verbal survey creation instructions is described in further detail below with reference to FIG. 7.

To organize a digital survey within the survey database 204, the survey management system 114 initially creates survey question attributes to track each digital survey question within the digital survey. As used herein, the term "survey attribute" refers to an attribute or trait associated with a digital survey. In particular, a survey attribute can refer to an attribute of a digital survey, a digital survey question part of the digital survey, and/or a survey response associated with the survey question. For example, a survey attribute can refer to a survey identifier ("survey ID"), a question identifier ("question ID"), all or a portion of question text, a question type, and/or an answer format. As described herein, a survey attribute is persistent with a digital survey—i.e., each survey attribute associated with a particular digital survey remains with that particular digital survey as stored and maintained within a survey database.

In some cases, the survey management system 114 creates survey attributes without user input, while in other cases the survey management system 114 associates survey attributes based on user input. For example, as part of creating survey 206, the survey management system 114 creates a survey identifier for survey 206 and a question identifier for each digital survey question within the survey 206. Accordingly, based on the survey identifier, the survey management system 114 distinguishes the survey 206 from other digital surveys in the survey database 204. Similarly, based on the question identifier, the survey management system 114 links one or more digital survey questions to the survey 206 within the digital survey database 204.

Moreover, the survey management system 114 can associate a digital survey or a digital survey question with one or more other survey attributes based on user-provided input or information (e.g., verbal survey creation instructions). As discussed above, the survey management system can associate survey attributes at the digital-survey level and/or the digital-survey question level. As a non-limiting example, survey management system 114 can associate a target audience attribute with the survey 206 at the digital-survey level based on information that a survey administrator provides that defines or indicates a target audience. In addition, the survey management system 114 can associate a digital-survey question within the survey 206 with a question type attribute and an answer format attribute at the digital-survey question level based on a verbal survey question that a survey administrator provides.

The survey management system 114 can further associate a survey identifier and/or a question identifier with a natural language question. In particular, to differentiate the natural language question from other natural language questions (or other questions) within the survey database 204 and/or within the survey 206, the survey management system 114 determines that the natural language question corresponds to a particular survey question. For example, the survey management system 114 creates a unique question flag or other question identifier for the natural language question and attaches, links, or otherwise associates the question identifier for the natural language question to the particular survey question.

By associating a natural language question with a question identifier, the survey management system 114 further associates a verbal response and a transcription of the verbal response with the question identifier. In other words, since the natural language question eventually results in receiving a verbal response (e.g., verbal response 212) from a respondent (e.g., respondent 120a) which, in turn, results in receiving a transcription of the verbal response (e.g., a text version of the verbal response) from a transcription service (e.g., transcription service 116), the survey management system 114 maintains the association of the question identifier throughout the process. The survey management system 114 propagates the question identifier through each part of the process from associating the question identifier with the natural language question, associating the question identifier to a resultant verbal response, and associating the same question identifier to a transcription of the verbal response. Thus, the survey management system 114 associates a natural language question, its corresponding verbal response(s), and the transcription(s) of the verbal response(s) with a single question identifier.

In a similar sense, the survey management system 114 can also (or alternatively) associate a natural language question with a survey identifier. By associating a natural language question with a particular survey identifier, the survey management system 114 differentiates the natural language question from other natural language questions and compartmentalizes the natural language question with its corresponding digital survey. In addition, to organize the survey database 204 (e.g., to avoid mixing questions/responses of one survey with those of another), the survey management system 114 associates the verbal response (e.g., verbal response 212) and the transcription of the verbal response resultant from the natural language question with the same survey identifier. Additional detail regarding survey identifiers and question identifiers is provided below with reference to FIG. 3.

The survey management system 114 also uses survey attributes to generate a text-based natural language survey question that corresponds to the digital survey question within survey 206 as illustrated by act 208 of FIG. 2. As used herein, a text-based natural language survey question refers to a computer-generated portion of text corresponding to a digital survey question. In particular, a text-based natural language survey question represents a conversion of a graphical user interface version of a digital survey question (e.g., a version for presentation to a respondent within a GUI) to a text-based version of a digital survey question to be converted to audio for presentation to a respondent by a voice-enabled. For example, a text-based natural language survey question can include a version of a digital survey question in simple text, rich text, hypertext markup language ("HTML"), or other digital text format capable of text-to-speech conversion (e.g., by a transcription service 116). The survey management system 114 generates a survey question that is made up of language that is commonly spoken and easily understood in speech communication (e.g., conversational language). The survey management system 114 generates the natural language survey question from a digital survey question by utilizing the known question attributes (e.g., survey identifier, question identifier, target audience, question type, and/or answer format).

To generate a text-based natural language survey question based on a digital survey question, the survey management system 114 identifies survey attributes associated with the digital survey question. Based on the survey attributes, the survey management system 114 determines known natural language phrases associated with the survey attributes. The survey system 114 then combines the natural language phrases with text within the digital survey question to construct a text-based natural language survey question that uses common speech language to ask a question that would prompt a respondent to provide a relevant response. Additional details regarding generating a text-based natural language question is described below in relation to FIGS. 3 and 8.

As shown in FIG. 2, the survey management system 114 distributes the natural language survey question to respondent 120a by providing the natural language survey question to the transcription service 116 to perform a text-to-voice conversion, as depicted by act 210. As mentioned above, although FIG. 2 depicts act 210 external from the survey management system 114 (e.g., a third-party transcription service), in other embodiments, the survey management system 114 includes the transcription service 109, and thus the survey management system 114 performs the text-to-voice conversion.

In act 210, the transcription service 116 converts the text-based natural language survey question into an audio survey question. As used herein, an audio survey question refers to an audio version of a digital survey question for presentation to a respondent using a voice-capable device. In some examples, an audio survey question is an audio version of the text-based natural language survey question.

For instance, the text-to-voice conversion of act 210 can involve analyzing the text-based natural language survey question and generating an audio survey question. In addition, the text-to-voice conversion can include generating a speech pattern for the words of the text-based natural language survey question so that, when played, the audio survey question has an accurate, natural-sounding auditory presentation. In at least one embodiment, act 210 involves generating an audio survey question using a generic computerized voice, while in at least one other embodiment, act 210 involves generating an audio survey question that uses a human voice (e.g., the voice of a voice actor and/or the original voice of the survey administrator or administrator).

As alluded to above, in some cases, a digital survey question may already be in a form that is ready for audible presentation to a respondent. In such a case, the survey management system 114 does not perform sequence act 208, and instead the survey management system 114 and/or the transcription service 116 performs act 210 to convert the digital survey question directly into voice without first generating a natural language version of the survey question. The survey management system can determine if natural language generation is needed based on survey attributes associated with a digital question (e.g., free form text answer format), and/or the text of the question portion within the digital survey question (e.g., a single sentence with a question mark). In addition, the survey management system 114 can determine if natural language generation is needed based on identifying that a digital survey question was previously input by an administrator as a verbal survey question, which indicates that the digital survey question likely already includes a natural language form.

As shown in FIG. 2, the schematic 200 further includes respondent client device 118a and respondent 120a. Additionally, the sequence includes the client device 118a presenting an audio survey question 214 to a respondent, and capturing a verbal response 212 from the respondent. As depicted, the survey management system 114, either directly or by way of the transcription service 116, provides the audio survey question 214 generated in act 210 to respondent client device 118a. For illustrative purposes, the original digital survey question as created by the administrator 102 at the administrator client device 104 includes the text, "On a scale from 0-10, how likely are you to recommend Company Q to a friend or colleague?" As can be seen in FIG. 2, the natural language generation of act 208 followed by the text-to-voice conversion of act 210 results in the respondent client device 118a providing the audio survey question 214, "How likely are you to recommend company Q to a friend?"

In response, the respondent 120a replies with a verbal response 212, "I really liked Company Q. I would very likely recommend them." The respondent client device 118a receives (e.g., captures, records, etc.) the verbal response 212. In particular, the respondent client device 118a captures the verbal response 212 from respondent 120a by way of a microphone of respondent client device 118a. Additionally, the respondent client device 118a sends the verbal response 212 to the transcription service 116 to perform a voice-to-text conversion, as shown by act 216. Indeed, in addition to converting text to speech, the transcription service 116 also converts speech to text.

In one or more embodiments, the respondent 120a may provide an answer that does not correlate with a meaningful survey response that would result in a survey result (e.g., the respondent 120a asks the respondent client device 118a to repeat the question as the verbal response 212). In such a case, the respondent client device 118a, based on the survey management system 114 receiving an unmeaningful verbal response (e.g., a transcription of an unmeaningful verbal response, the survey management system 114 determines to resend the survey question, and does not generate (220) as survey result. This process can repeat until the survey management system 114 detects a verbal response 212 that is usable to generate (220) a survey result.

In one or more embodiments, the survey management system 114 can attach verification instructions to an audio survey question that cause the client device 118a to verify that the verbal response meets certain requirements prior to sending the verbal response to the survey management system 114. For example, in the event that the digital survey question pertains to obtaining a user's zip code, the digital client device 118a can verify the verbal response using the verification instructions that indicate the verbal response should include five numbers within the response. In some embodiments, the response need not include only five numbers to pass the verification. For example, a respondent may provide a verbal response of "My zip code is 12345." In such a case, the client device 118a would verify that the verbal response at least includes five numbers, and thus the client device 118a would send the verbal response. Moreover, in the event a verbal response does not pass verification, the client device 118a can repeat the question.

Notwithstanding the above cases pertaining to an unmeaningful response, FIG. 2 further illustrates that the respondent client device 118a provides the verbal response (e.g., an audio file) to the transcription service 116 to convert the verbal response 212 to text by implementing a speech-to-text technique (e.g., digitally transcribe), as shown by act 216. For example, act 216 can involve analyzing the voice inflection, pronunciation, annunciation, and other speech patterns of the verbal response 212. Additionally, act 216 can involve analyzing the phraseology (e.g., word choice) of the verbal response. Upon analyzing the verbal response 212, the transcription service 116 generates a text transcription of the verbal response 212 that the transcription service 116 provides to the survey management system 114. As mentioned, in at least one embodiment, the transcription service 116 is part of the survey management system 114.

Upon receiving the transcription of the verbal response 212, the survey management system 114 performs natural language processing on the transcription, as depicted by act 218 of FIG. 2. In particular, act 218 may involve implementing a natural language processing technique to identify one or more key phrases within the transcription of the verbal response 212. As used herein, a key phrase is a word, phrase, clause, sentence, or other portion the transcription of the verbal response 212 that indicates an important feature of the verbal response 212. For example, a key phrase may be a noun that indicates the subject (e.g., Company Q) of a verbal response (e.g., verbal response 212). Additionally or alternatively, a key phrase may be a word or phrase that indicates an inclination toward, attitude toward, opinion of, feedback to, answer to, or reply to the subject of a survey question. For instance, as illustrated in FIG. 2, key phrases within the verbal response 212 may be "really liked," "Company Q," and "very likely recommend." Accordingly, to identify the key phrases within the transcription, the survey management system 114 parses text and/or otherwise delineates between the words, punctuation, and other parts of the transcription of the verbal response 212.

In one or more embodiments, the survey management system 114 uses the text of the digital survey question, as well as survey attributes of the digital survey question, to search for particular words, phrases, punctuation, and/or other parts of the transcription of the verbal response 212. For example, a known question attribute such as a question type and/or an answer format may indicate to the survey management system 114 that the verbal response 212 is likely to include particular phrasing or is likely to contain a particular word. For instance, if an answer format includes a potential answer choice of "Product X," then the survey management system 114 can search the transcription of the verbal response for the term "Product X." Accordingly, the survey management system 114 analyzes the transcript of the verbal response 212, using survey attributes as a bearing to hone in on and search for particular key phrases with the transcription. Additional detail regarding the natural language processing of act 218 is provided below with reference to FIGS. 4 and 8.

As further illustrated by FIG. 2, the scheme 200 includes an act 220, which illustrates that the survey management system 114 generates survey results from the verbal response 212. In particular, upon receiving the transcription of the verbal response 212 and performing natural language processing (act 218) on the transcription, the survey management system 114 generates a survey result for the digital question. For instance, the survey management system 114 correlates certain identified key phrases with particular survey results. Based on the verbal response illustrated in FIG. 2, for example, the survey management system 114 may identify the key phrases "really liked," "Company Q," and "very likely recommend" as key phrases that, when considered together, indicate that the respondent 120a would be extremely likely to recommend Company Q to a friend or colleague.

As mentioned, the survey management system 114 considers the survey attributes to generate survey results. As a non-limiting example, the survey management system 114 identifies and uses an answer format when analyzing the transcription of the verbal response 212. For instance, the digital survey question example from FIG. 2, may include an answer format of a Net Promoter Score® ("NPS") (e.g., based on a question of, "On a scale from 0-10, how likely are you to recommend Company Q to a friend or colleague?"). The survey management system 114 identifies the NPS answer format, and accordingly the survey management system 114 further identifies that the survey result to such a question is a rating on a scale from 0-10 (i.e., a number between 1-10). Accordingly, on identifying an answer format of a survey result for a digital survey question, the survey management system 114 determines to convert the transcription of the verbal response 212 to an NPS survey result.

To convert the transcription of the verbal response 112 to a particular answer format corresponding to a survey result, the survey management system 114 analyzes the transcription of the verbal response to determine a survey result that matches an answer format. For example, and continuing with the NPS example from above, the survey management system 114 analyzes the transcription of the verbal response to identify key words and phrases to extrapolate a numbered rating on a scale from 0-10 that is commensurate with the opinion and/or feelings expressed by the respondent 120a in the verbal response 212. For instance, based on determining the verbal response 112 includes a very positive sentiment, the survey management system 114 can assign a numerical survey result of 10. In contrast, based on determining the verbal response 112 includes a very negative sentiment, the survey management system 114 can assign a numerical survey result of 1.

The type of analysis the survey management system 114 performs can vary based on survey attributes. As another example, a digital survey question can have an answer format that includes a selection of an answer from a discrete set of possible answers (e.g., for a multiple-choice question type). In such a case, the survey management system 114 can use keywords from each answer from the discrete set of possible answers to search the transcription of the verbal response 112 for a keyword that matches one or more answers within the set of possible answers. Based upon identifying a keyword within the transcription of the verbal response 112, the survey management system assigns the answer corresponding with the identified keyword as the survey result. Further detail regarding the act 220 of generating survey results is provided below with relation to FIG. 4.

Once the survey management system 114 determines a survey result corresponding to a digital survey question, the survey management system 114 stores the survey result. As shown in FIG. 2, the schematic 200 further includes a results database 222 including survey results 224. In particular, the survey management system 114 stores the generated survey results 224 (e.g., from act 220) within the results database 222. As mentioned, the survey results 224 are in a format that is usable by the survey management system 114 for data analysis and other analytics, converted from the verbal survey response 212.

Although FIG. 2 illustrates an administrator client device 104 triggering the survey management system 114 to create (act 202) and distribute a digital survey, in some embodiments, the survey management system 114 creates and/or distributes a digital survey in response to a different trigger. For example, in these or other embodiments, the survey management system 114 receives a trigger in the form of an indication that an individual has entered a room (e.g., by way of a motion sensor), entered a car, opened a door, begun using an appliance, etc. Accordingly, the survey management system 114 receives an external trigger and, in response, provides a digital survey question to the respondent 120a based on the processes described above.

Furthermore, to motivate the respondent 120a to respond to the audio survey question 214, the survey management system 114 may further provide incentives. For example, in one or more embodiments, the survey management system 114 provides an interesting anecdote relating to an area of interest of the respondent 120a (e.g., as indicated by a user profile of the respondent 120a maintained by the survey management system 114) in exchange for receiving a verbal response 212. Additionally, or alternatively, the survey management system 114 can provide information to the respondent 120a of a comparison of how the respondent's verbal response 212 compares with other received responses. For example, the survey management system 114 can provide a comparison against an average taken from the responses of all respondents, a percentage of respondents that agree or disagree with the respondent 120a (e.g., where responses are similar or dissimilar), a total number of respondents that agree or disagree, and/or characteristics of respondents that agree or disagree.

Figure 3:
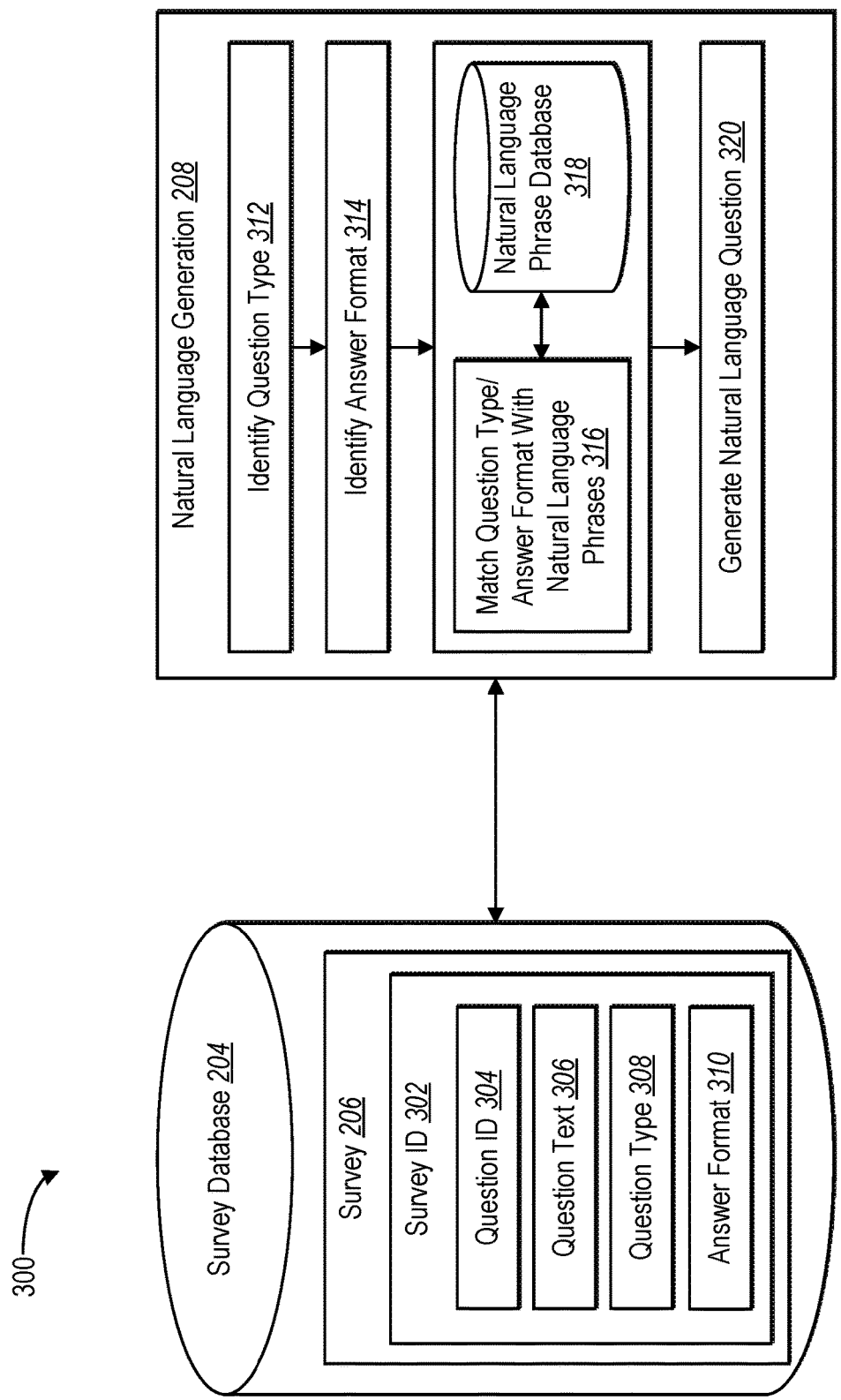
FIG. 3 illustrates an example schematic diagram for generating a natural language survey question in accordance with one or more embodiments.

Referring now to FIG. 3, a natural language generation process 300 is shown. In particular, the natural language generation process 300 includes a survey database 204 that includes a digital survey (e.g., survey 206 from FIG. 2) with a survey identifier 302 (or simply "survey ID"). The survey ID 302 includes, for each digital survey question within the digital survey, a question identifier 304 (or simply "question ID"), question text 306, question type 308, and answer format 310. As described above, the survey ID 302, question ID 304, question text 306, question type 308, and answer format 310 are survey attributes associated with a digital survey question.

For example, based on receiving survey creation instructions, the survey management system 114 associates a survey ID 302 with a digital survey within survey database 204. Additionally, the survey management system 114 creates a question ID 304 for each digital survey question received from the administrator client device 104 for the digital survey. Moreover, as described above, the survey management determines or receives additional survey attributes, for example, question text 306, question type 308, and answer format 310.

As discussed, in other cases the survey management system 114 receives a verbal survey question from an administrator (e.g., administrator 102). In the case when the survey management system 114 creates a digital survey from a verbal survey question, the survey management system 114 identifies speech elements within the verbal survey question. In particular, the survey management system 114 identifies a key term, a voice inflection, and/or a sentence structure of the verbal survey question. (See FIG. 5 and associated description). The survey management system 114 uses speech elements to determine a call of the question, a focus on the question, and/or other characteristics of the question. Based on the identified speech elements, the survey management system 114 identifies survey attributes to associate with the digital survey and/or digital survey question.

Using the digital survey question text and one or more survey attributes, the survey management system generates a text-based natural language survey question, as illustrated in act 208 of FIG. 3. In particular, the survey management system 114 identifies the question type in act 312. In other words, the survey management system 114 accesses the survey database 204 to identify the question type 308 that corresponds to a digital survey question. Additionally, the survey management system 114 accesses the survey database 204 to identify an answer format 310 that corresponds to the digital survey question, as shown by act 314 of FIG. 3.

Generally, the survey attributes 302-310, as defined above, are digital tags, metadata, or other indicators by which the survey management system 114 can identify the attributes of a digital survey question. Although FIG. 3 illustrates that the survey management system 114 only identifies the question type 308 in act 312, and the answer format 310 in act 314, it will be understood based on the disclosure herein, that the survey management system 114 identifies more or fewer survey attributes from among the survey attributes 302-310 stored within the survey database 204. In addition, survey database 204 can store additional survey attributes not necessarily shown in FIG. 3, but discussed above.

As further illustrated in FIG. 3, the survey management system 114 matches the survey attributes (e.g., the question type 308 and the answer format 310) with natural language phrases, as shown by act 316. In particular, the survey management system 114 maintains a natural language phrase database 318 of stored natural language phrases that correspond to particular survey attributes. From the natural language phrase database 318, the survey management system 114 utilizes those natural language phrases that correspond to the survey attributes 302-310 of the digital survey question.

For example, a digital survey question can include a question portion of "Which of the following do you like best?" having two answer choices of "Product X" and "Product Y." In such a case, the survey management system 114 identifies that the digital survey question is a multiple-choice type (e.g., in act 312) with an answer format (e.g., in act 314) having two potential answer choices, one for "Product X" and one for "Product Y." Based on a combination of the question portion of the digital survey question, and the survey attributes, the survey management system 114 matches or otherwise determines a natural language phrase for use within a text-based natural language survey question. For example, the identified phrase is, "Do you like . . . ?" Accordingly, the survey management system 114 determines that the phrase, "Do you like . . . ?" is the appropriate phrase to use at the beginning portion of a text-based natural language survey question corresponding to the digital survey question.

In addition, based on the answer format and the two potential answers, the survey management system 114 can further determine to include the answer choices within the text-based natural language survey question. For example, based on determining that there are only two potential answers, the survey management system 114 can determine to provide the answer choices in the text of the text-based natural language survey question. Therefore, in the above-described example digital survey question, the survey management system 114 can determine to include "Product X" and "Product Y" in the text of the text-based natural language survey question. In other cases, when there are more than four potential answer choices for example, the survey management system 114 may identify another natural language phrase in from database 318 that results in a more open ended question, but also is directed toward obtaining a response that includes one of the four potential answer choices.

Moreover, the survey management system 114 matches the appropriate natural language phrases and other identified text elements (e.g., the potential answer choices) to append them together to generate a conversational, natural language survey question that is easy to understand when converted to audio and played to a respondent (e.g., respondent 120a) by a voice-enabled client device (e.g., respondent client device 118a). For example, as illustrated in FIG. 3, the natural language generation process 300 includes an act 320 to generate a natural language question. In particular, the act 320 can involve generating filler words, organizing the matched natural language phrases to generate a natural language survey question that is grammatically correct (e.g., syntactically, morphologically), and semantically (e.g., sensibly) correct.

As mentioned above, in at least one embodiment, the survey management system 114 may not perform act 208—i.e., the survey management system 114 may not generate a natural language survey question. Instead, in these embodiments, the survey management system 114 may distribute the text of the digital survey question as originally created in act 202 of FIG. 2 to be converted from text to voice and provided by way of the voice-capable respondent client device 118a.

Figure 4:
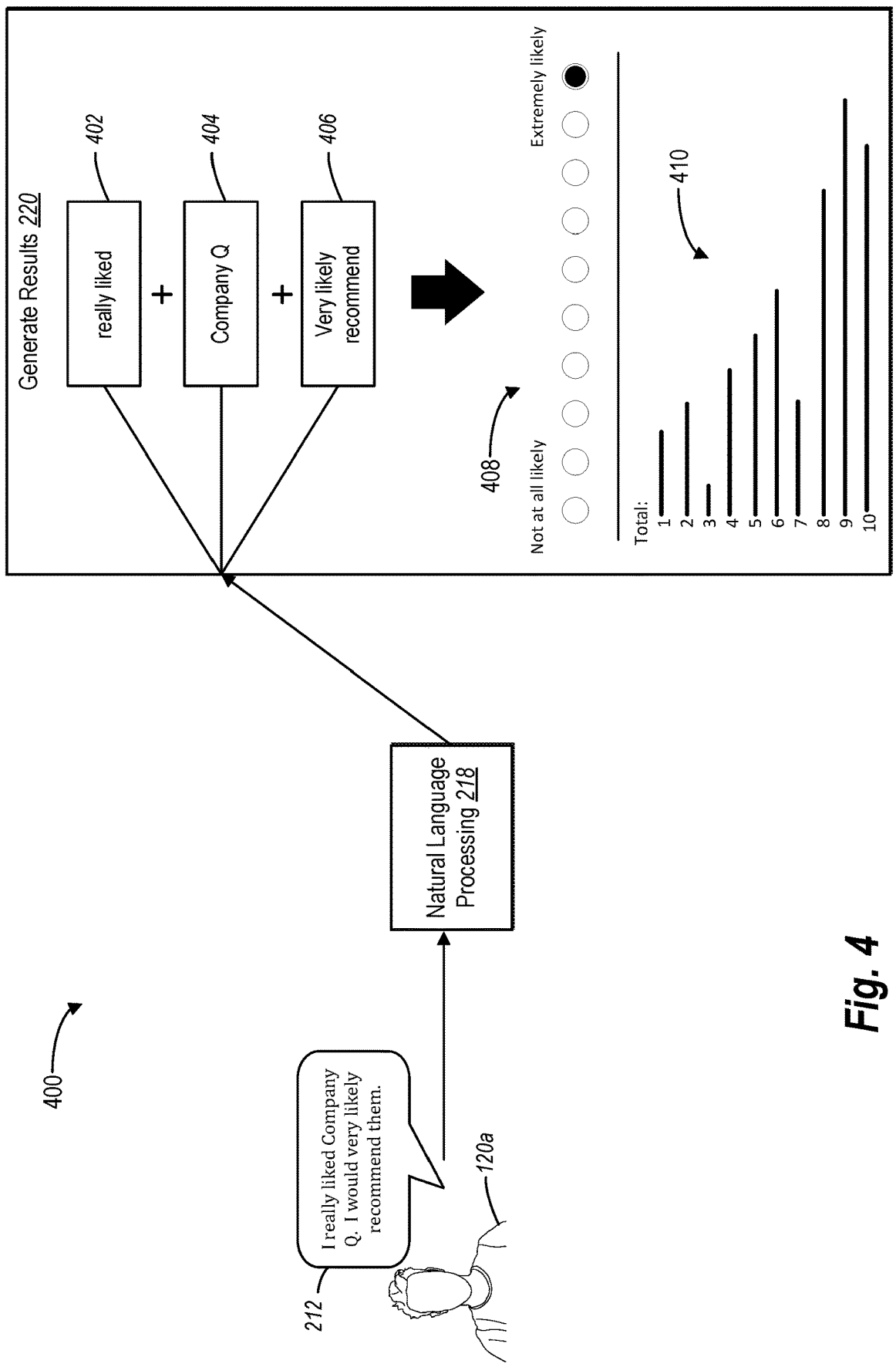
FIG. 4 illustrates an example process of generating survey results in accordance with one or more embodiments.

Referring now to FIG. 4, a result generating process 400 is shown as an example of act 220 of FIG. 2 ("Generate results"). In particular, the result generating process 400 includes the respondent 120a, the verbal response 212, the natural language processing act 218 (e.g., as shown in FIG. 2), and the generate results act 220. As illustrated in FIG. 4, and as described above, the survey management system 114 receives a transcript of the verbal response 212, whereupon the survey management system 114 performs natural language processing in act 218 (see FIG. 8). Based on the natural language processing, the survey management system 114 identifies response elements from the transcription of the verbal response 212. For example, the survey management system 114 identifies key phrases, response phrasing, voice emphasis, etc., from the verbal response 212.

Based on the identified response elements, the survey management system 114 generates survey results, as indicated in act 220 of FIG. 4. For example, based on the results of the natural language processing, the survey management system 114 identifies key phrases 402-406. As shown in FIG. 4, the key phrases 402-406 of the verbal response 212 are, "really liked," "Company Q," and "very likely recommend." As can be seen in FIG. 4, the survey management system 114 considers the identified key phrases 402-406 together. That is to say, the survey management system 114 generates a survey result 408 based on a combined effect of the key phrases 402-406.

Thus, in the event that the survey management system 114 identifies a single key phrase (e.g., "really liked"), then the corresponding first survey result may vary from a second survey result based on a combination of key phrases (e.g., key phrases 402-406). For instance, whereas a single statement of, "I really liked Company Q" may result in the survey management system 114 generating survey result in the range of a 6 on a scale from 0-10 (10 being most pleased or most likely to recommend), the combination of the key phrases "really liked" as well as "very likely recommend" result in the survey management system 114 determining a survey result of a 10.

Additionally, in some embodiments, the survey management system 114 weights identified key phrases 402-406 to generate the survey result 408. For example, in one embodiment, the survey management system 114 weights key phrase 402 with a lesser weight than key phrase 406. By weighting key phrase 402 with a lesser weight (and therefore key phrase 406 with a greater weight), key phrase 406 has more of an impact as to the generated survey result 408. To weight the key phrases 402-406, the survey management system 114 relies on the natural language processing of act 218 to indicate which key phrases are more impactful on, and/or more indicative of, the actual feelings and opinion of the respondent 120a.

To illustrate weighting of key phrases, the survey management system 114 may implement a factor-based weighting technique. For example, the survey management system 114 determines that a response including the word "like" corresponds to a single-weighted positive factor (e.g., $1 \times W^+$). The survey management system 114 may likewise determine that a response including the phrase "really like" corresponds to a double-weighted positive factor (e.g., 2×W⁺). Similarly, the survey management system 114 may determine that words/phrases such as "best," "awesome," "great," "super," etc., correspond to triple-weighted positive factors, quadruple weighted positive factors or a facsimile thereof. In addition to determining positive weights, the survey management system 114 may also determine negative weights in response to identifying terms that, in context, have negative connotations such as, for example, "dislike," "no good," "worst," etc.

As can be appreciated, a verbal response could conceivably contain multiple key phrases where some are positive and some are negative. By weighting the key phrases and determining the overall effect of the verbal response, the survey management system 114 more accurately generates a survey result 408 in accordance with the opinion of the respondent 120*a*.

Additionally, as shown in FIG. 4, the survey management system 114 further generates a collective survey result 410. In other words, the survey management system 114 tracks each generated survey result from multiple respondents 120 and, from an accumulation of each generated survey result, determines a collective survey result 410. The survey management system 114 compiles the generated results into a collective survey result 410 that indicates an overall opinion of a group of respondents 120. For example, as shown in FIG. 4, the survey management system 114 compiles collective result 410, indicating, for each number in the scale from 0-10, the number or proportion of respondents 120 that have given a response indicative of each respective number rating.

It will be appreciated that, in at least one embodiment, the survey management system 114 compiles a collective result 410 including generated survey results (e.g., generated result 408) generated from verbal responses (e.g., verbal response 212) in addition to digital survey responses received directly as a selection of a number on the scale from 0-10 (e.g., from respondents 120 who opt to respond by way of a GUI on a smartphone or another electronic client device). Thus, the survey management system 114 can manage a hybrid digital survey where the digital survey question is distributed in multiple formats (e.g., verbal, text, etc.) across multiple platforms (e.g., web, mobile, audio), and likewise where survey responses are received in multiple formats across multiple platforms.

Figure 5:
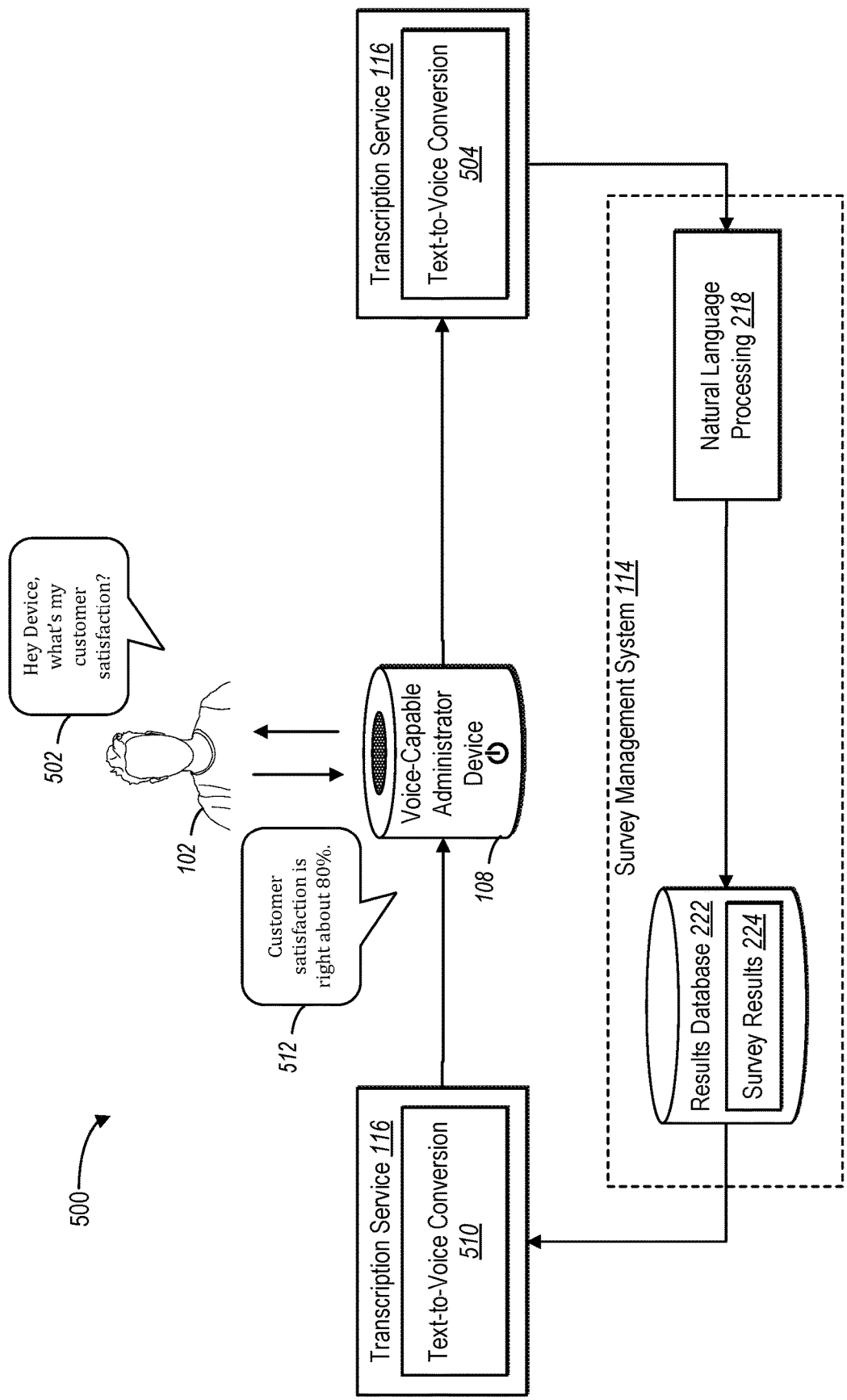
FIG. 5 illustrates an example schematic diagram for reporting digital survey results in accordance with one or more embodiments.

FIG. 5 illustrates a reporting process 500. In particular, the reporting process 500 shown in FIG. 5 includes administrator 102, report request 502, voice-capable administrator device 108, voice-to-text conversion 504, survey management system 114, text-to-voice conversion 510, and flash briefing 512. Additionally, survey management system 114 further includes natural language processing 218 (as mentioned above and described in further detail below with reference to FIG. 8). Although FIG. 5 depicts the voice-capable administrator device 108, the voice-to-text conversion 504, and the text-to-voice conversion 510 outside of (e.g., external to) the survey management system 114, in at least one embodiment, the voice-capable administrator device 108, the voice-to-text conversion 504, and the text-to-voice conversion 510 are part of and operated/implemented by the survey management system 114.

As shown in FIG. 5, the voice-capable administrator device 108 receives a report request 502 from the administrator 102. The report request 502 of the reporting process 500 is a verbal request vocalized by the administrator 102, "Hey Device, what's my customer satisfaction?" As illustrated in FIG. 5, the voice-capable administrator device 108 receives the report request 502. The voice-capable administrator device 108 provides the report request 502 to the transcription service 116 to perform act 504 of voice-to-text conversion 504. In particular, act 504 may involve implementing a speech-to-text as described above to create a transcription of the report request 502. The transcription service 116 provides the transcription of the report request 502 to the survey management system 114.

Additionally, the survey management system 114 receives the transcription of the report request 502 and, as described above with relation to FIGS. 2 and 4, performs natural language processing as shown by act 218. In particular, the survey management system 114 analyzes the transcription of the report request 502 to identify survey attributes. For example, the survey management system 114 analyzes the words used in the transcription of the report request 502 to identify a survey identifier, a question identifier, a question type, an answer format, and/or a target audience of the survey question corresponding to the report request 502. The survey management system 114 finds, within a survey database 204 and/or a results database 222, the survey results 224 that coincide with the requested information indicated in the report request 502. The survey management system 114 finds the requested information by using the question attributes as tags or pointers to indicate the location of the survey results 224 within the results database 222.

By identifying question attributes such as a survey identifier and/or a question identifier, the survey management system 114 determines which survey results (e.g., survey results 224) from within results database 222 are requested by the response request 502. In some embodiments, the survey management system identifies the survey results 224 from within results database 222 by identifying certain indicator terms (e.g., words or phrases) within the transcription of the report request 502 that indicate the survey results 224. In addition, the report request may include a device ID associated with the voice-capable administrator device that the survey management system 114 uses to identify the administrator account with the survey management system 114. Accordingly, based on a combination of device ID, user ID, and indicator terms within the transcription of the report request, the survey management system 114 can locate survey results corresponding to the report request 512.

To illustrate from FIG. 5, the report request 502 uses the question, "Hey Device, what's my customer satisfaction?" From the transcription of this report request, the survey management system 114 recognizes that the administrator 102 is asking a question about the term "customer satisfaction," which corresponds to an NPS survey question. Therefore, the survey management system 114 locates the survey results 224 relating to the NPS survey for that particular administrator 102 by using the survey identifier, question identifier, and/or other question attributes that define that particular NPS survey question. Although FIGS. 2 and 5 illustrate the results database 222 separate and distinct from survey database 204, in at least one embodiment, results database 222 and survey database 204 can be within the same database, or else can be a single database that stores both digital surveys as well as survey results.

As can be appreciated, before providing the survey results 224 to the transcription service 116 to perform act 510, the survey management system 114 may additionally generate a survey result summary. The survey result summary is a reworded version of the survey results 224 that is easier to understand in prose and more succinct. In some embodiments, the survey management system 114 creates a survey result summary by rounding off numbers (e.g., by rounding to the nearest decimal place, whole number, or a rounded number). For example, as shown in FIG. 5, the survey management system 114 creates a survey result summary rounding survey results of, for instance, 79.6% customer satisfaction to a rounded number of "right about 80%."

Accordingly, the survey management system 114 generates, in at least one embodiment, a survey result or survey result summary (e.g., flash briefing 512) in accordance with a determined result format. In particular, the survey management system 114 determines a result format for generating a survey result. The survey management system 114 determines the result format based on a request from the administrator 102, information stored in the results database 222, and/or information gathered in the natural language process 218, as described below. For example, in at least one embodiment, the survey management system 114 determines the result format based on question attributes (e.g., question type, answer format, etc.) associated with the generated digital survey question.

Additionally, the survey management system 114 provides the survey results 224 to the administrator 102. In particular, as shown in FIG. 5, the survey management system 114 sends the survey results 224 to the transcription service 116 to perform text-to-voice conversion, as indicated by act 510. The transcription service 116 implements a text-to-speech technique as described above to convert the text-based survey results 224 into audio survey results. Particularly, the act 510 can involve techniques similar in concept to the natural language generation techniques as described above with respect to FIG. 3. That is to say, the transcription service 116 converts the text-based survey results 224 into an audio-based natural language expression of those results that is easy to understand when read aloud.

In one or more embodiments, act 510 can involve inserting filler words or simplification terms when converting the survey results 224 (e.g., the survey results summary) into audio. For example, act 510 can involve using terms such as "around," "about," "near," or other approximation terms within the converted audio survey results (e.g., the flash briefing 512). As can be seen in FIG. 5, the flash briefing 512 includes the sentence, "Customer satisfaction is right about 80%." The transcription service 116, in act 510, inserts the phrase "right about" to accurately express the rounding of the survey results 224 from, for example, 78% to 80%.

The audio survey results can also be referred to as a flash briefing 512. The transcription service 116 further provides the converted flash briefing 512 to the voice-capable administrator device 108, whereupon the voice-capable administrator device 108 provides (e.g., plays) the flash briefing to the administrator 102. As illustrated in FIG. 5, the voice-capable administrator device 108 plays the flash briefing 512, "Customer satisfaction is right about 80%," over a speaker or other piece of hardware capable of projecting sound.

Additionally or alternatively, the survey management system 114 can slice survey results 224. In other words, the survey management system 114 can segment or compartmentalize survey results 224 based on the report request 502. Particularly, in cases where the report request 502 queries the survey management system 114 about a particular portion of the survey results 224 relevant to a particular survey question (e.g., "What is my customer satisfaction for the last three months?"), the survey management system 114 identifies the subset of the survey results 224 that corresponds to the requested information. Accordingly, the survey management system 114 generates and provides a flash briefing 512 to report the pertinent subset of survey results 224, in accordance with the disclosure above, where the flash briefing 512 provides a natural language report of, in this example, customer satisfaction over the last three months.

In addition to a time period (e.g., "for the last three months"), the survey management system 114 can also slice survey results 224 according to sex, gender, age, location, date, etc. To illustrate, the survey management system 114 can, in response to receiving a report request 502 directed to a specific gender, generate and provide a flash briefing 512 that conveys the requested information (e.g., a customer satisfaction among males). Likewise, the survey management system 114 generates and provides a flash briefing 512 in accordance with the disclosure provided above in response to receiving a report request 502 requesting information relating to age, location, date, etc.

Figure 6:
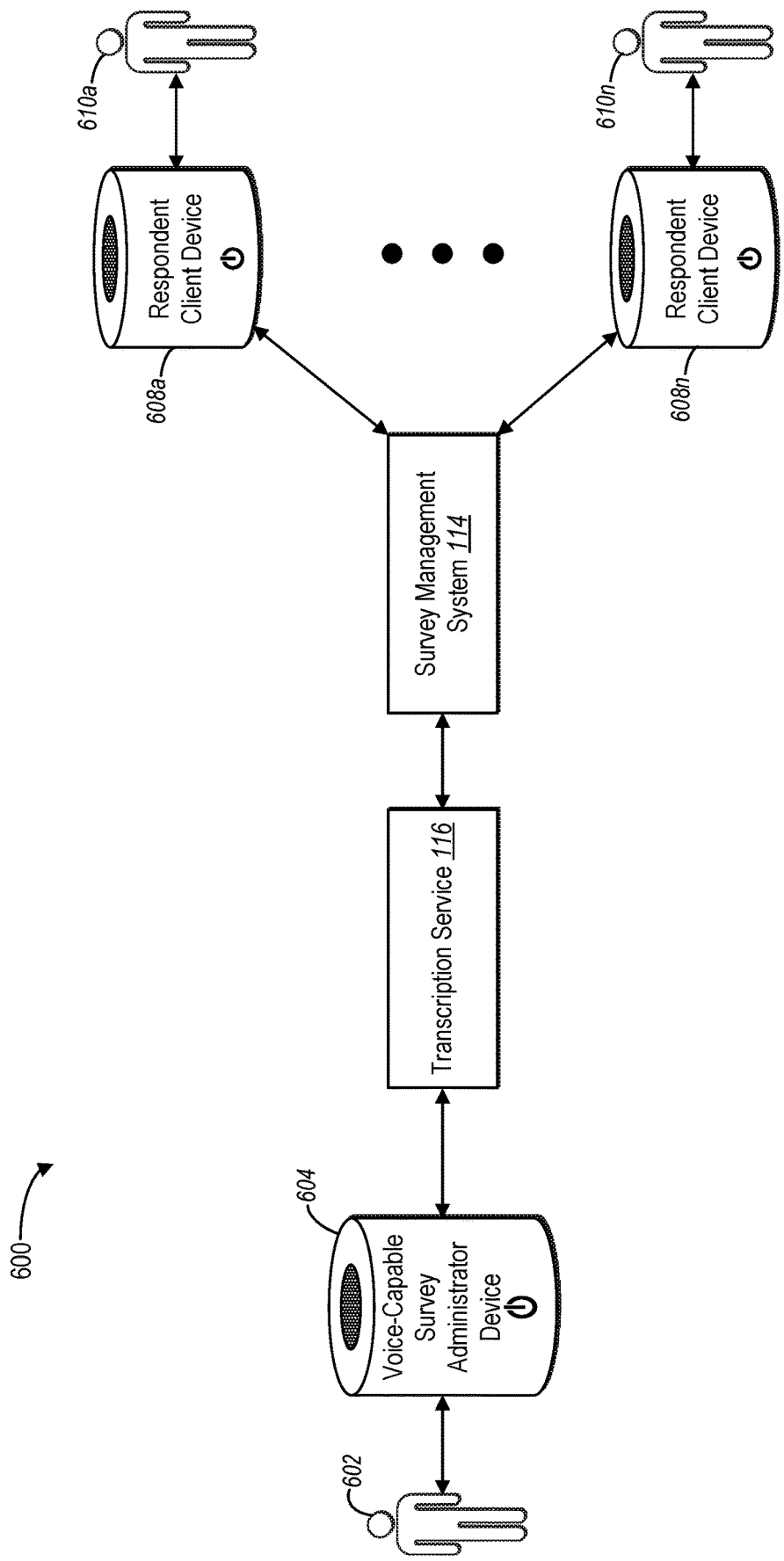
FIG. 6 illustrates a schematic diagram of an example environment of a survey management system in accordance with one or more embodiments.

FIG. 6 illustrates another embodiment of an example environment for implementing the survey management system 114. In particular, FIG. 6 illustrates a survey distribution environment 600 including a survey administrator 602, a voice-capable survey administrator device 604, a transcription service 116, a survey management system 114, respondent client devices 608a-608n (referred to herein as "respondent client devices 608"), and respondents 610a-610n (referred to herein as "respondents 610"). Although not illustrated in FIG. 6, the survey distribution environment 600 may, in at least one embodiment, include a network similar to network 110 as described above with reference to FIG. 1. Additionally, the survey management system 114 may alternatively be on a server(s), such as server(s) 112 of FIG. 1. Furthermore, in one or more embodiments, the transcription service 116 is included within the survey management system 114, and that the survey management system 114 implements the transcription service 116 as a component therein.

As shown in FIG. 6, the survey management system 114 communicates with the transcription service 116, the voice-capable survey administrator device 604, and the respondent client devices 608 either directly or via a network. As described above, a survey administrator 602 can request to create a digital survey by way of voice-capable survey administrator device 604. In particular, survey administrator 602 verbally asks a question (e.g., a verbal survey creation instruction) to the voice-capable survey administrator device 604, whereupon the voice-capable survey administrator device 604 communicates with the transcription service 116 to transcribe the verbal survey question into a text-based survey question. The survey management system 114 communicates with the transcription service 116 to receive the transcription of the verbal survey question and further communicates with the respondent client devices 608 to distribute the transcription of the verbal survey question.

Figure 7:
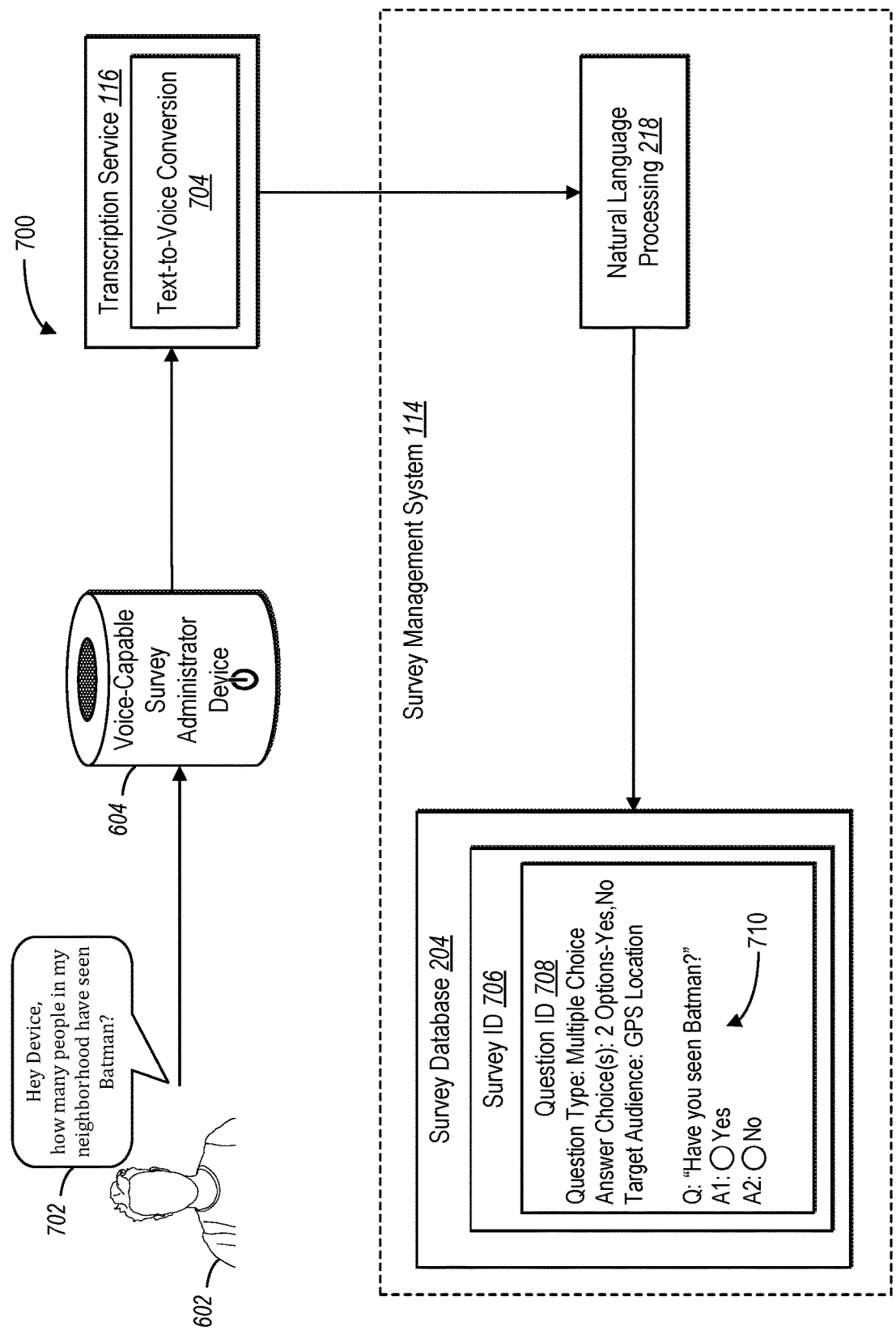
FIG. 7 illustrates an example schematic diagram for curating a digital survey question in accordance with one or more embodiments.

For example, FIG. 7 illustrates a survey creation process 700 based on a verbal survey creation instruction that an administrator provides to the survey management system 114. In particular, the survey creation process 700 includes the survey administrator 602, a verbal survey question 702, a voice-capable survey administrator device 604, a voice-to-text conversion act 704, and survey management system 114. Additionally, survey management system 114 further includes natural language processing act 218 and survey database 204. Survey database 204 further includes a digital survey with a survey ID 706 and a generated digital survey question 710 with a question ID 708.

For example, as shown in FIG. 7, the survey management system 114 creates, distributes, and/or manages a digital survey in response to a verbal survey question 702 asked by a survey administrator 602 directed to a voice-capable survey administrator device 604 associated with the survey administrator 602. The process shown in FIG. 7 can not only allow sophisticated administrators (e.g., working for companies) to use the survey management system from a voice-cable device, but also allow less sophisticated administrators (e.g., any user of a voice-enabled device, such as smart phones, or at home voice-enabled systems). For instance, the survey administrator 602 can ask the verbal survey question 702, "Hey Device, how many people in my neighborhood have seen BATMAN?" to a voice-capable smart TV. Thus, the survey management system 114 enables a survey administrator 602 to gather information about a topic of interest from a wide array of more informal locations such as, for example, a room of a house (e.g., by way of a smart home device), a vehicle (e.g., by way of a voice-capable device therein), and/or by way of a smartphone of the survey administrator 602.

As illustrated in FIG. 7, the survey management system 114 receives a transcription of a verbal survey question 702. In particular, the voice-capable survey administrator device 604 captures a vocalization of a survey question spoken by the survey administrator 602. For example, the voice-capable survey administrator device 604 captures verbal survey question 702, "Hey Device, how many people in my neighborhood have seen BATMAN?" The voice-capable survey administrator device 604 further sends the captured verbal survey question 702 to a transcription service 116 to perform voice-to-text conversion 704. The act 704 may involve implementing a speech-to-text technique as described above to transcribe or otherwise convert the verbal survey question 702 into a text-based format. Accordingly, the act 704 involves creating a text-based transcription of the verbal survey question 702.

As further illustrated in FIG. 7, the survey management system 114 receives the transcription of the verbal survey question 702. In particular, the survey management system 114 communicates with the transcription service 116 and/or the voice-capable survey administrator device 604 to receive a transmission of the transcript of the verbal survey question 702. Generally, the transcription of the verbal survey question 702 includes every word spoken as directed to the voice-capable survey administrator device 604. In other words, the voice-capable survey administrator device 604 and/or the transcription service 116 (e.g., performing act 704) do not add or remove any words or other alter the verbal survey question 702.

As also illustrated in FIG. 7, upon receiving the transcription of the verbal survey question 702, the survey management system 114 implements a natural language processing technique, as shown by act 218. The survey management system 114 performs natural language processing to determine question attributes of the verbal survey question 702. For example, the survey management system 114 determines that the verbal survey question 702 is best distributed as a multiple-choice question with two possible answer choices; "yes" and "no." This way, the survey management system 114, upon receiving responses from the target audience, can tally the number of "yes" responses to provide easy to understand survey results to the survey administrator 602, as described above.

Additionally, the survey management system 114 generates a digital survey question 710 corresponding to the verbal survey question 702. In other words, when the survey administrator 602 asks a question directed to the voice-capable survey administrator device 604, the survey management system 114 creates, within a survey database 204, a digital survey including a digital survey question 710 for the purpose of gathering the requested information from survey respondents. For example, as illustrated in FIG. 7, the digital survey question 710 includes the question, "Have you seen BATMAN?" and the corresponding answer choices "yes" and "no." In addition, the survey management system 114 generates a survey ID 706 for the created digital survey, and further generates a question ID 708 for the generated digital survey question 710 to organize and track the digital survey question 710 within the survey database 204.

As shown in FIG. 7, the survey management system 114 identifies that the verbal survey question 702 is best distributed to a target audience of people within the same neighborhood as the survey administrator 602. To distribute the digital survey question 710 to those respondents in the same neighborhood as the survey administrator 602, the survey management system 114 may further include a global positioning system (GPS) locator based on an indication of the user's location that the voice-capable client device 604 includes within the verbal survey question. In addition, the survey management system 114 can search for potential respondents sending a query to identify client-devices associated with respondents that are within the administrator's 604 neighborhood.

In particular, the survey management system 114 may define an area around the survey administrator's house as a neighborhood for purposes of distributing the digital survey question 710. For example, the survey management system 114 may, in at least one embodiment, use a GPS location system to define an area having a one mile radius around the survey administrator's house as the survey administrator's neighborhood. Accordingly, the survey management system 114 may then distribute the digital survey question 710, as described above, to respondents 610 within the defined neighborhood. In additional embodiments, an administrator can reference a city, state, country, or other geographic location description, and the survey system 114 can define a geolocation perimeter to perform a search for potential respondents within the perimeter.

Although FIG. 7 illustrates a verbal survey question 702 intending for a target audience of respondents 610 within a neighborhood, it will be understood that the survey management system 114 distributes a digital survey question (e.g., digital survey question 710) to a target audience based on factors other than geographic location or proximity to the survey administrator 602. In some embodiments, the survey management system 114 may locate a target audience based on association such as, for example, membership in a particular work group, family, group of friends, customer base, etc. Additionally or alternatively, the survey management system 114 may distribute a digital survey question to a particular target audience based on other factors such as profile information or other desired factor indicated within the verbal survey question 702. Profile information can include information relating to age, sex, gender, income, household size, location, employment, interests, etc.

Figure 8:
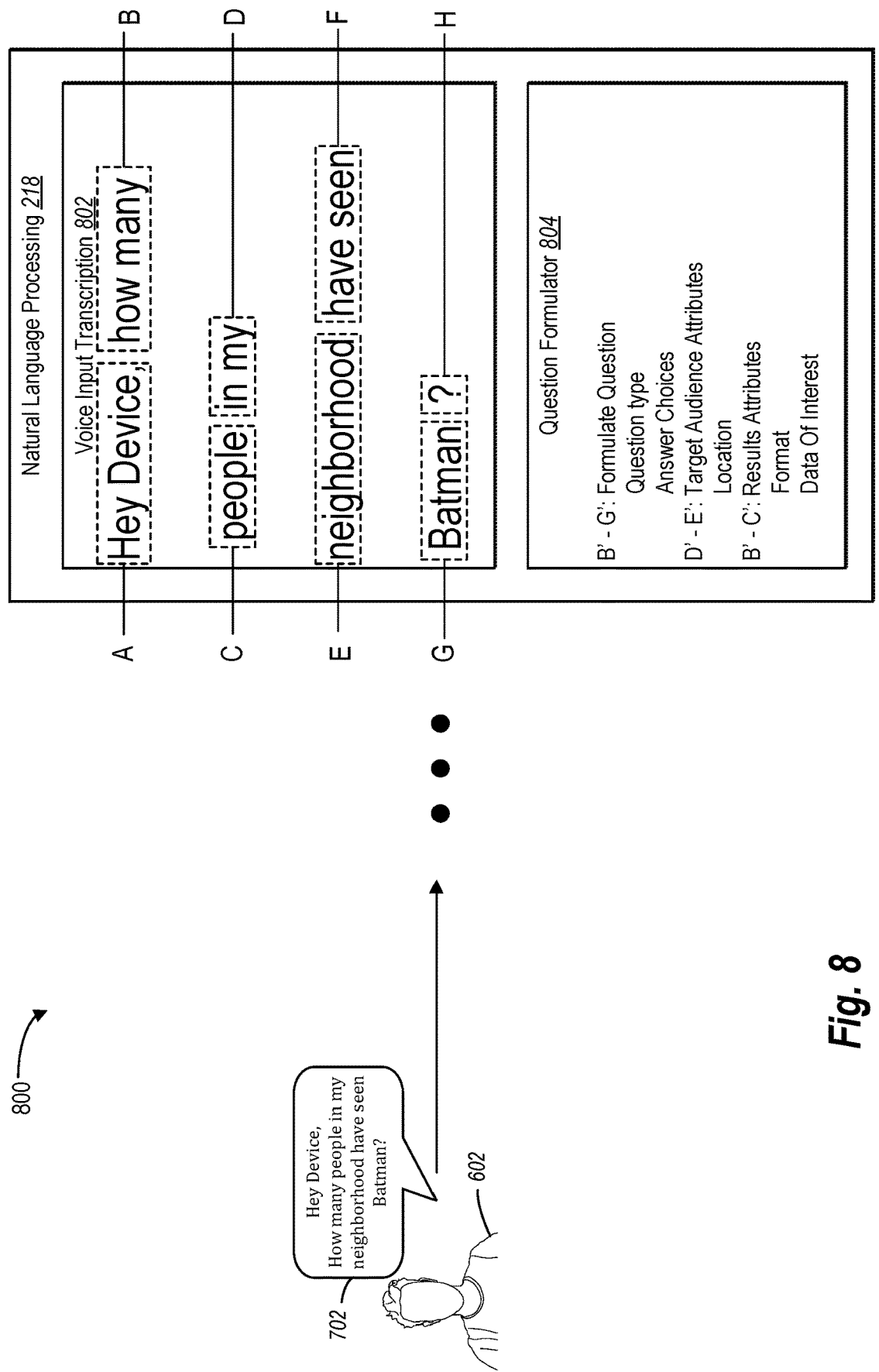
FIG. 8 illustrates an example process of natural language processing in accordance with one or more embodiments.

FIG. 8 illustrates a schematic of a natural language process 800 as an example of act 218 of FIG. 2. In particular, natural language process 800 includes the survey administrator 602, the verbal survey question 702, and the act 218 of natural language processing. Natural language processing 218 further includes a voice input transcription analysis 802 and a question formulator 804. It will be understood from the disclosure that, in some embodiments, the question formulator 804 may be a response formulator for the survey management system 114 to perform natural language processing on survey responses. Likewise, in these or other embodiments, the verbal survey question 702 may be a verbal survey creation instruction or a verbal response.

As shown in FIG. 8, the voice input transcription analysis 802 of natural language processing 218 includes identified terms A-H. In particular, the survey management system 114 performs natural language processing 218 on a transcription of the verbal survey question 702 to identify the terms within the verbal survey question 702. For example, the survey management system 114 receives a transcription of the verbal survey question 702 from the transcription service 116. To analyze the transcription, the survey management system 114 performs natural language processing 218 to identify speech elements (e.g., key terms, sentence structure, question phrasing, etc.) within the transcription of the verbal survey question 702. As described in further detail below, the survey management system 114 also identifies survey attributes of the verbal survey question 702 from the speech elements.

The survey management system 114 performs additional operations in response to identifying the identified terms A-H. Upon identifying term A ("Hey Device"), however, the survey management system 114 may not perform any responsive function. Rather, a voice-capable device such as respondent client devices 118 or 610 and/or voice-capable administrator device 108 and/or voice-capable survey administrator device 604 may passively detect a trigger term such as term A, and then respond to term A by waking up and actively recording to additional words spoken by the administrator 102, respondent 120a or 610a, and/or survey administrator 602.

As also shown in FIG. 8, the terms A-H correspond with the features A'-H' as illustrated in the question formulator 804. In particular, the question formulator 804 formulates (e.g., creates, generates, etc.) a digital survey question (e.g., digital survey question 710) based on identified terms A-H which, upon identification, cause the question formulator 804 to format the digital survey question in such a way as to satisfy the requirements of the terms A-H.

As an example, terms B-G may cause the question formulator 804 to formulate a digital survey question having a certain question type, answer format, and/or other question attributes, as described above. The terms B-G may further cause, upon identification, the question formulator 804 to phrase the digital survey question (e.g., digital survey question 710) in such a way as to prompt a respondent (e.g., respondent 610a) to provide a response that is congruous with the question type, answer format, and/or other question attributes.

In at least one embodiment, the transcription service 116 initiates the survey creation application 106 as a result of detecting that the verbal survey question 702 is indeed a survey question intended for a particular target audience. In particular, the term H ("?") may indicate a voice inflection detected in the verbal survey question 702 (or verbal survey creation instructions or verbal response). In particular, in at least one embodiment, the transcription service 116 recognizes, based on voice inflection, word choice, sentence structure, and/or other factors, that the verbal survey question 702 (or other verbal input) is indeed a question and that the verbal survey question 702 further indicates an intention on behalf of the survey administrator 602 to open the survey creation application 106 to create a digital survey, as described above.

As further shown in FIG. 8, the survey management system 114 receives a transcription of the verbal survey question from the transcription service 116. In addition, the survey management system 114 identifies, within the voice input transcription 082, terms that indicate question attributes, as also described above. For example, the survey management system 114 identifies term B ("how many") as a significant term indicating an answer format and/or a question type. For instance, the phrase "how many" may cause the survey management system 114, by way of question formulator 804, to create a digital survey question 710 having a multiple-choice type format with an answer format including two possible responses: "yes" and "no." Other possible formats include, but are not limited to, text entry questions, matrix table questions, rank order questions, slider questions, constant sum questions, hot spot questions, heat map questions, ranking order questions, NPS questions, drill down questions, and others, each corresponding with a respective answer format. Accordingly, the question formulator 804 may create a digital survey question 710 that results in collecting a survey result of an accumulation of a total number of "how many" respondents within the target audience have viewed BATMAN.

As shown in FIG. 8, the example question formulator 804 indicates that terms B-G correspond to triggers that cause the question formulator 804 to formulate a question having certain question attributes. As indicated by D'-E', identified terms D-E within the verbal survey question 702 correspond to target audience attributes such as geographic location. Additionally, since the verbal survey question 702 uses the phrase "in my neighborhood" to define a target audience, the question formulator 804 identifies, from the transcription of the verbal survey question 702, the combination of D ("in my") and E ("neighborhood") as indicating attributes of the target audience. In this example, the attributes of the target audience are directed toward a geographic location or proximity to the survey administrator 602. However, in one or more embodiments, the target audience attributes may be based on a relationship with the survey administrator 602, a particular shared activity, likes, interests, or some other factor.

Similarly, as shown in FIG. 8, the question formulator 804 identifies terms B-C as corresponding to result attributes, as indicated by B'-C'. In particular, the question formulator 804, upon analyzing the transcription of the verbal survey question 702, determines that the combination of term B ("how many") and term C ("people") indicates a desire on the part of the survey administrator 602 to collect survey results corresponding to a total number that represents a group of people. In this way, the question formulator 804 formulates the digital survey question (e.g., digital survey question 710) to gather responses from which the survey management system 114 can generate usable survey results.

For example, the question formulator 804 formulates the digital survey question 710 to say, "Have you seen BATMAN?" Accordingly, the survey management system 114 distributes the generated question to the target audience—i.e., those respondents in the neighborhood of the survey administrator 602. The survey management system 114 further collects verbal responses as described above and, from those verbal responses, discerns either a "yes" or "no" as the appropriate digital survey response. Accordingly, the survey management system 114 totals the number of "yes" responses to generate a survey result for the generated digital survey question 710. As described above, the survey management system 114 reports the survey result to the survey administrator 602 by way of a voice-capable device.

It will be understood from the disclosure that the depiction of the natural language processing 218 in FIG. 8 is exemplary and not intended to be limiting. In one or more embodiments, the survey management system 114 may identify each word in a transcription of a verbal survey question (e.g., the transcription of the verbal survey question 702), each sentence in a verbal survey question transcription, or other segment or portion of the verbal survey question transcription. In other words, the survey management system 114 performs natural language processing 218 to properly formulate a digital survey question (e.g., digital survey question 710) according to one or more natural language processing techniques/algorithms (e.g., natural language processing application program interfaces (APIs)). Such techniques or algorithms include, but are not limited to, latent sematic indexing (LSI), latent Dirichlet allocation (LDA), and/or machine learning techniques such as Nearest Neighbor, Naïve Bayes, and/or GOOGLE SyntaxNet.

Figure 9:
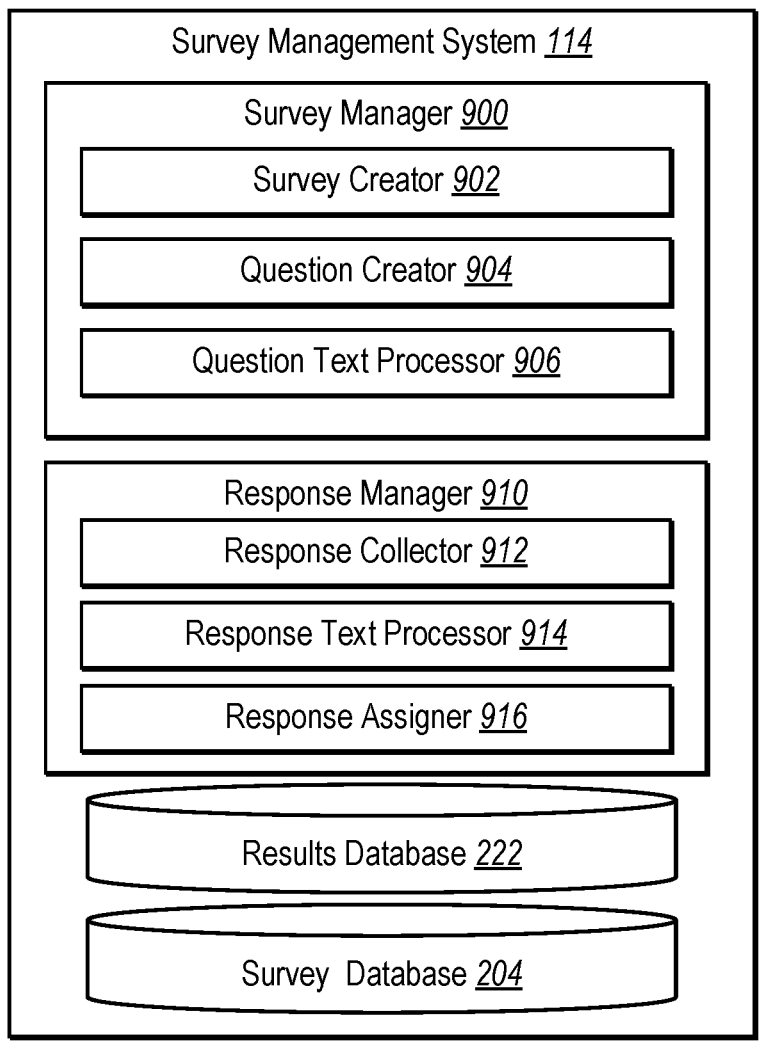
FIG. 9 illustrates an example schematic diagram of a survey management system in accordance with one or more embodiments.

FIG. 9 illustrates a schematic diagram of an example survey management system 114. The survey management system 114 can be an example embodiment of the survey management system 114 as described above. Further, the survey management system 114 can be executed on a digital survey system over the web, mobile devices, or other platforms implementing appropriate technologies for transmitting digital survey information.

As shown in FIG. 9, the survey management system 114 can include various components such as the survey manager 900, the response manager 910, the results database 222, and the survey database 204. Furthermore, the survey manager 900 can include a survey creator 902, a question creator 904, and a question text processor 906. Additionally, the response manager 910 can include a response collector 912, a response text processor 914, and a response assigner 916.

The survey manager 900 may manage, create, provide, analyze, distribute, or otherwise interact with a digital survey including one or more survey questions (e.g., verbal survey questions or digital survey questions). In particular, the survey creator 902 can create a digital survey by communicating with the survey database 204 to generate a digital survey with a distinct survey ID. Additionally, the survey creator 902 can communicate with the question creator 904 to create one or more individual digital survey questions within the digital survey, each digital survey question having a unique question identifier.

The survey creator 902 and the question creator 904 can communicate with one or more voice-capable devices to receive information pertaining to the creation of a digital survey and/or a digital survey question. As described above, the survey manager 900 can include a question text processor 906. In particular, the question text processor 906 can, upon receiving transcriptions of verbal survey questions, process the text of the transcriptions. For example, the question text processor 906 can perform natural language processing to analyze a transcription of a verbal survey question. Accordingly, the question text processor 906 can communicate with the survey creator 902 and/or the question creator 904 to provide the necessary information to create a digital survey from a transcription of a verbal survey question.

Likewise, the question text processor 906 can analyze digital survey question text to perform natural language generation of a text-based natural language survey question. Additionally, the question text processor 906 can communicate with the survey creator 902 and the question creator 904 to create and distribute a text-based natural language survey question. For example, the survey manager 900 may communicate with a voice transcription service to convert the text-based natural language survey question into an audio-based natural language survey question and to provide the audio-based natural language survey question to respondents by way of voice-capable devices.

The response manager 910 may manage, create, provide, analyze, distribute, or otherwise interact with a survey response (e.g., a verbal survey response or a digital survey response). In particular, the response collector 912 of the response manager 910 can receive transcriptions of verbal survey responses captured by voice-capable devices and transcribed by a voice transcription service. The response collector 912 can collect one or more responses from a single respondent or else may collect responses from multiple respondents. Thus, the response collector 912 can gather and organize survey responses for a particular digital survey.

The response manager 900 can further communicate with the survey manager 900 to organize responses collected by the response collector 912 according to survey identifiers and/or question identifiers. In other words, the response manager 900 matches a received response to the question identifier of the question to which the respective response was directed, the question being within a particular survey with a survey identifier, as described above.

To match a given response with the proper survey identifier and/or question identifier, the response text processor 914 processes the text of the transcription of the response. Additionally, the response text processor 914 identifies, within the analyzed text of the transcription, the question attributes associated with a given response, such as the respective question identifier and survey identifier. Furthermore, the response text processor 914 analyzes the text of the response to generate a survey result from the response, as described above. The response text processor 914 can communicate with the results database 222 to store the survey result associated with the particular survey and survey question. Additionally, the response text process 914 communicates with the response assigner 916 to associate a given response with the proper survey and question.

As shown in FIG. 9, the response assigner 916 can communicate with the survey manager 900 to locate the proper survey (via the survey identifier) and survey question (via the question identifier) to which the response belongs. The response assigner 916 may further communicate with the survey database 204 to locate the proper digital survey within the survey database 204. Additionally, the response assigner 916 can communicate with the results database to store a generated survey result (e.g., from the response) within the results database 222 in a location with a pointer or other identifier to tie the results to the corresponding digital survey within the survey database 204.

The components of the survey management system 114 can comprise hardware, software, or both. For example, the components 900-916, 204, and 222 can comprise one or more instructions stored on a computer-readable storage medium and executable by processors of one or more computing devices, such as a client device or server device. When executed by the one or more processors, the computer-executable instructions of the survey management system 114 can cause the computing device(s) to perform the survey creation, distribution, and response collection methods described herein. Alternatively, the components 900-916, 204, and 222 can comprise hardware such as a special purpose processing device to perform a certain function or group of functions. Alternatively still, the components 900-916, 204, and 222 of the survey management system 114 can comprise a combination of computer-executable instructions and hardware.

Figure 10:
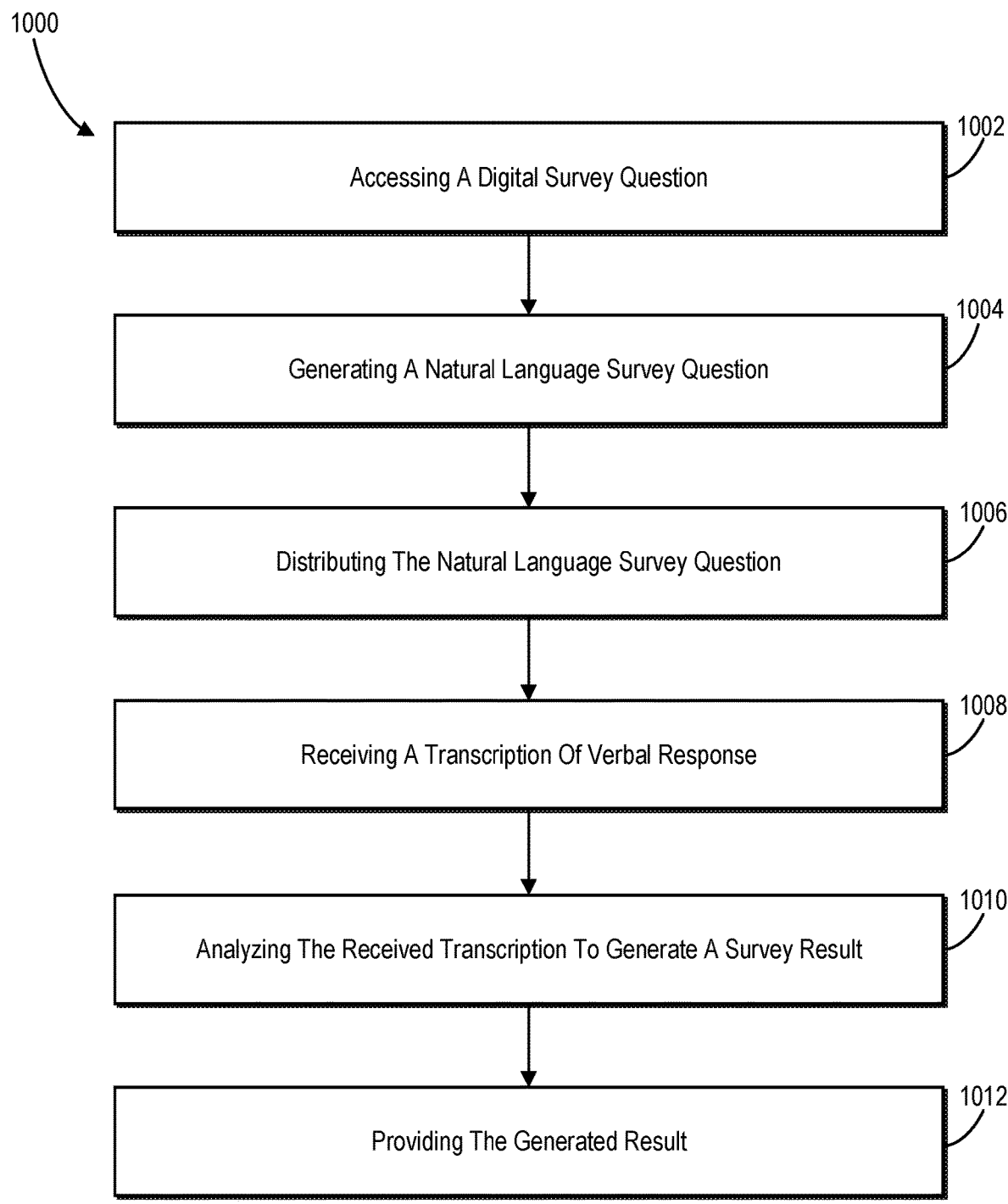
FIG. 10 illustrates a flowchart of a series of acts in a method for managing a digital survey in accordance with one or more embodiments.

FIGS. 1-9, the corresponding text, and the examples provide a number of different systems and methods that manage a digital survey over voice-capable computing devices. In addition to the foregoing, embodiments can also be described in terms of flowcharts comprising acts and/or steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in any number of different orders or sequences. Additionally, the steps/acts described herein may be repeated or performed in parallel with one another or in parallel with different instances of the same or other similar steps/acts.

FIG. 10 illustrates a flowchart of a series of acts in a method 1000 of administering a digital survey over voice-capable devices. In one or more embodiments, the method 1000 is performed in a digital survey environment including an administrator device and one or more respondent devices (e.g., performed by software running on one or more computing devices). The method 1000 is intended to be illustrative of one or more methods in accordance with the present disclosure, and is not intended to limit potential embodiments. Alternative embodiments can include additional, fewer, or different steps than those articulated herein with respect to FIG. 10.

As illustrated in FIG. 10, the method 1000 includes an act 1002 of accessing a digital survey question. In particular, the act 1002 can involve accessing, by at least one processor, a digital survey question corresponding to a digital survey to be administered to at least one respondent and received from an electronic device associated with survey administrator.

In addition, the method 1000 of FIG. 10 includes an act 1004 of generating a natural language survey question. In particular, the act 1004 can involve generating, by analyzing the digital survey question, a text-based natural language survey question corresponding to the digital survey question, the text-based natural language survey question comprising (e.g., made up of or including) natural spoken phraseology and natural spoken sentence structure. In one or more embodiments, the act 1004 can further involve formulating the text-based natural language survey question by appending one or more natural language phrases associated with one or more survey question attributes together, as described in further detail above. As also described in detail above, the one or more question attributes can include one or more of a target audience, a question type, a question identifier, an answer format, or a survey identifier.

In at least one embodiment, the method 1000 can further include an act of analyzing the one or more survey question attributes to identify, from a plurality of natural language phrases, at least one natural language phrase that corresponds to the one or more survey question attributes.

The method 1000 further includes an act 1006 of distributing the natural language survey question. In particular, the act 1006 can involve distributing the text-based natural language survey question to one or more respondents by sending the text-based natural language survey question to a voice transcription service to convert the text-based natural language survey question into an audio survey question, and to provide, by way of a voice-capable device, the audio survey question to a respondent. In one or more embodiments, the act 1006 can involve identifying, based on the one or more survey question attributes, a target respondent belonging to a target audience and providing the audio survey question to the target respondent.

As shown in FIG. 10, the method 1000 can further include an act 1008 of receiving a transcription of a verbal response. In particular, the act 1008 can involve receiving, from the voice transcription service, a transcription of a verbal response captured by the voice-capable device associated with the respondent. In at least one embodiment, the voice transcription service is a third-party transcription service, as described above.

The method 1000 further includes an act 1010 of analyzing the received transcription to generate a survey result. In particular, the act 1010 can involve analyzing the received transcription of the verbal response to generate a survey result for the digital survey question. In one or more embodiments, the act 1010 can involve implementing a natural language processing technique to identify one or more key phrases.

As shown in FIG. 10, the method 1000 further includes an act 1012 of providing the generated result. In particular, the act 1012 can involve providing the generated survey result to the survey administrator. In one or more embodiments, the method 1000 can further include an act of correlating the one or more identified key phrases with a particular survey result from among a plurality of possible survey results, each of the plurality of possible survey results corresponding to different key phrases.

Figure 11:
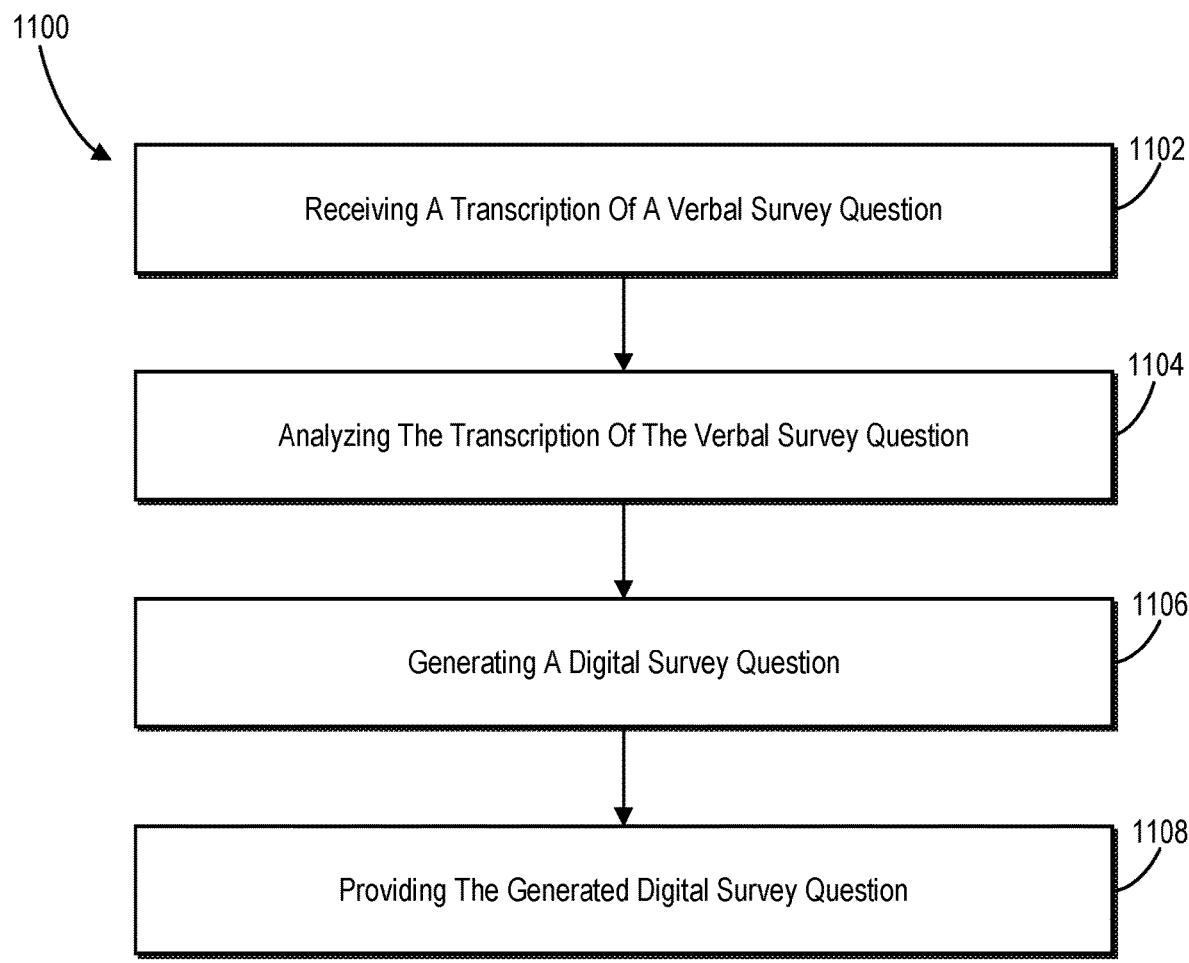
FIG. 11 illustrates a flowchart of a series of acts in a method for managing a digital survey in accordance with one or more embodiments.

FIG. 11 illustrates another example flowchart of a series of acts in a method 1100 of administering a digital survey over voice-capable devices. The method 1100 can include an act 1102 of receiving a transcription of a verbal survey question. In particular, the act 1102 can involve receiving, from a voice transcription service, a transcription of a verbal survey question captured by a first voice-capable device associated with a survey administrator.

As shown in FIG. 11, the method 1100 can further include an act 1104 of analyzing the transcription of the verbal survey question. In particular, the act 1104 can involve analyzing, by at least one processor, the transcription of the verbal survey question to identify speech elements within the transcription. In one or more embodiments, the act 1104 can further involve utilizing a natural language processing algorithm to identify speech elements within the transcription of the verbal survey question. In the same or other embodiments, the speech elements can include one or more of a key term, a voice inflection, or a sentence structure.

The method 1100 can further include an act 1106 of generating a digital survey question. In particular, the act 1106 can involve generating, based on the identified speech elements, a digital survey question to correspond to the verbal survey question.

As illustrated in FIG. 11, the method 1100 can also include an act 1108 of providing the generated digital survey question. In particular, the act 1108 can involve providing the generated digital survey question to one or more respondents. In at least one embodiment, the act 1108 can involve using one or more voice-capable devices associated with the one or more respondents to play an audio survey question corresponding to the generated digital survey question.

In at least one embodiment, the method 1100 can further include an act of identifying one or more question attributes associated with the generated digital survey question, wherein the one or more question attributes include one or more of a target audience, a question type, a question identifier, an answer format, or a survey identifier.

Furthermore, in at least one embodiment, the method 1100 can include an act of determining, based on the one or more question attributes associated with the generated digital survey question, a result format for the digital survey question. The method 1100 can also include an act of receiving, from the voice transcription service, one or more response transcriptions of verbal survey responses from the one or more respondents. Furthermore, the method 1100 can include an act of analyzing, in accordance with the determined result format, the one or more response transcriptions to identify response elements that correspond to the determined result format. The method 1100 can still further include an act of generating, based on the identified response elements, survey results according to the determined result format.

In one or more embodiments, the response elements include one or more key phrases that correspond with one or more survey results. Additionally, in the same or other embodiments, the method 1100 can include an act of receiving, from the survey administrator, a request for the generated survey results, and an act of providing, to the survey administrator by way of the first voice-capable device, the generated survey results.

Additionally or alternatively, the method 1100 can include an act of identifying, based on analyzing the transcription of the verbal survey question, a portion of the transcription of the verbal survey question indicating a target audience for the survey question. Additionally or alternatively still, the method 1100 can include an act of distributing the generated digital survey question to the target audience.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
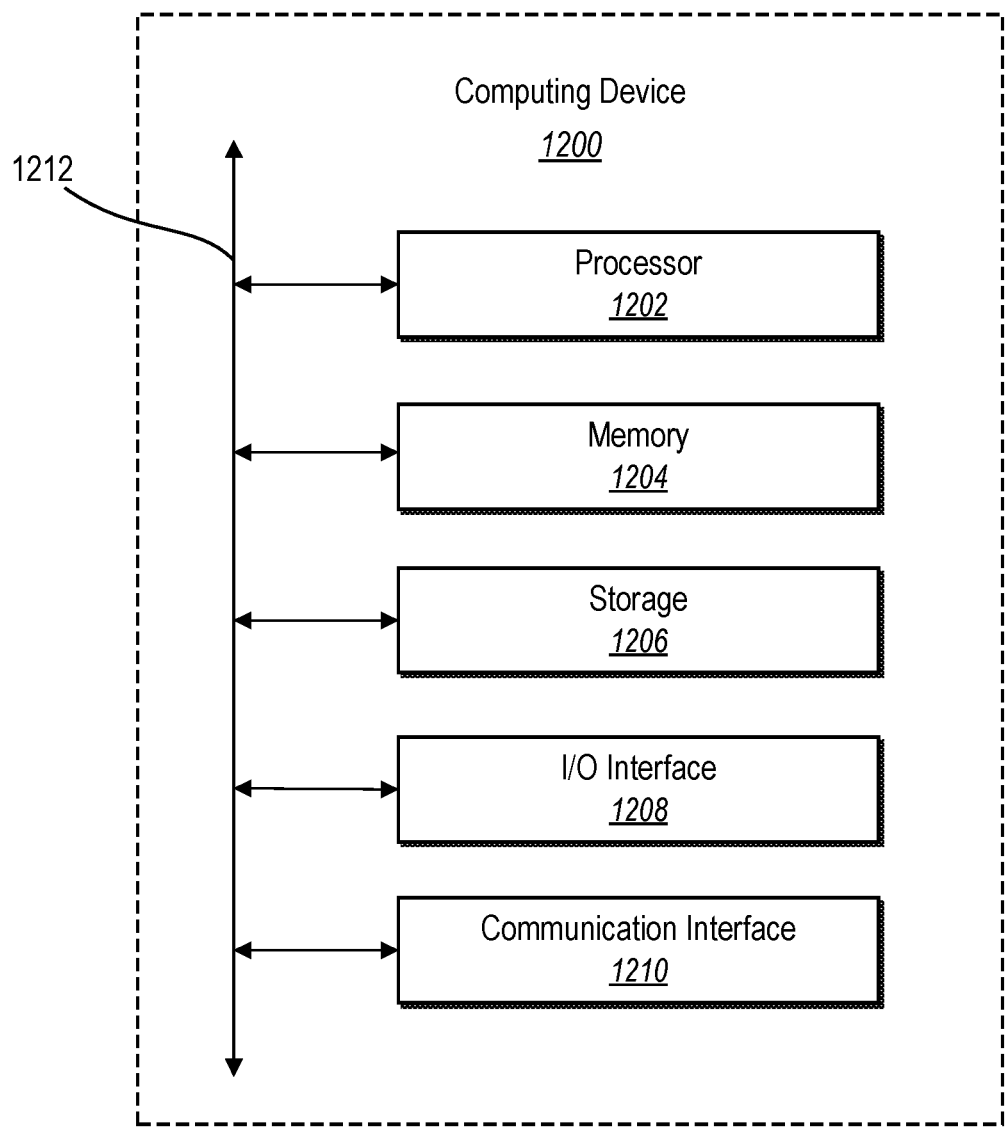
FIG. 12 illustrates a block diagram of an example computing device in accordance with one or more embodiments.

FIG. 12 illustrates, in block diagram form, an exemplary computing device 1200 that may be configured to perform one or more of the processes described above. One will appreciate that the survey management system 114 can comprise implementations of the computing device 1200. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a communication infrastructure 1212. The communication infrastructure 1212 can comprise hardware, software, or both that couples components of computing device 1200 to each other.

Additionally or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
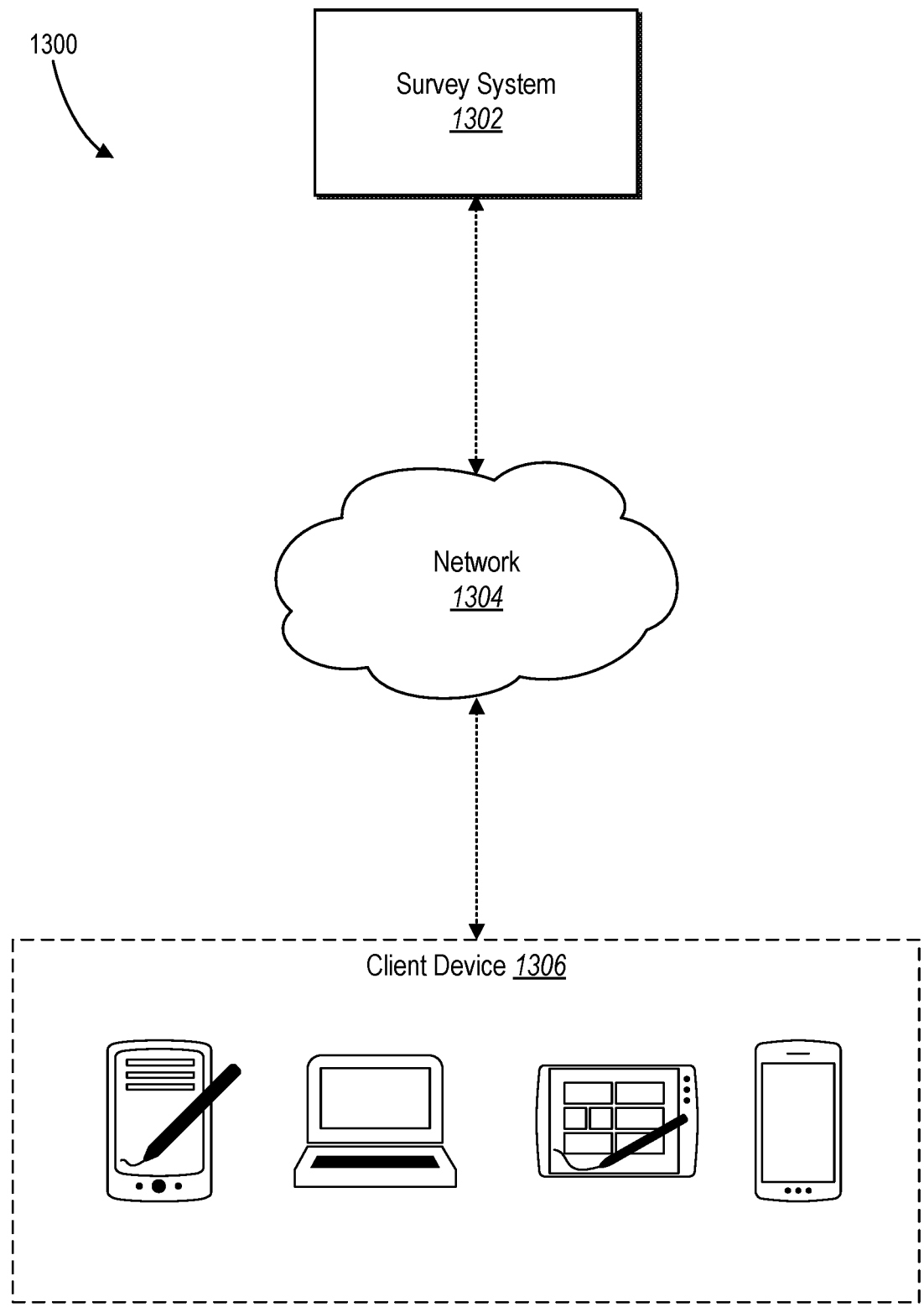
FIG. 13 illustrates a networking environment of a biometric survey system in accordance with one or more embodiments.

FIG. 13 illustrates an example network environment 1300 of a survey system 102. Network environment 1300 includes a client device 1306, and a survey system 1302 connected to each other by a network 1304. Although FIG. 13 illustrates a particular arrangement of client device 1306, survey system 1302, and network 1304, this disclosure contemplates any suitable arrangement of client device 1306, survey system 1302, and network 1304. As an example, and not by way of limitation, two or more of client device 1306, and survey system 1302 may be connected to each other directly, bypassing network 1304. As another example, two or more of client device 1306 and survey system 1302 may be physically or logically co-located with each other in whole, or in part. Moreover, although FIG. 13 illustrates a particular number of client systems 1306, survey systems 1302, and networks 1304, this disclosure contemplates any suitable number of client systems 1306, survey systems 1302, and networks 1304. As an example, and not by way of limitation, network environment 1300 may include multiple client device 1306, survey systems 1302, and networks 1304.

This disclosure contemplates any suitable network 1304. As an example, and not by way of limitation, one or more portions of network 1304 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1304 may include one or more networks 1304.

Links may connect client device 1306, and survey system 1302 to communication network 1304 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above. A client device 1306 may enable a network user at client device 1306 to access network 1304. A client device 1306 may enable its user to communicate with other users at other client systems 1306.

In particular embodiments, client device 1306 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1306 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1306 one or more Hyper Text Markup Language (HTML) files responsive to the HTTP request. Client device 1306 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey system 1302 may include a variety of servers, sub-systems, programs, modules, logs, and data stores. In particular embodiments, survey system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 1302 may also include suitable components such as network interfaces, security mechanisms, load balancers, failover servers, management-and-network-operations consoles, other suitable components, or any suitable combination thereof.

In particular embodiments, survey system 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondents, customers, etc.).

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   receiving, from a survey administrator client device, a digital survey question comprising user-provided text and corresponding to a digital survey to be administered to at least one respondent;

determining a question type of the digital survey question by analyzing the user-provided text using at least one processor to identify key terms and a sentence structure that indicate the question type;

matching a natural language phrase to the question type by identifying a stored natural language phrase that corresponds to the question type from within a natural language phrase database, wherein the natural language phrase comprises conversational language corresponding to the question type of the digital survey question;

generating a modified digital survey question by combining the natural language phrase with one or more of the key terms identified from the user-provided text;

distributing the modified digital survey question to a respondent by sending the modified digital survey question to a voice transcription service, wherein sending the modified digital survey question to the voice transcription service causes the voice transcription service to convert the modified digital survey question into an audio survey question and provide the audio survey question to a voice-capable device of the respondent;

receiving, from the voice transcription service and in relation to the audio survey question, a transcription of a verbal response of the respondent; and analyzing, by the at least one processor, the transcription of the verbal response to generate a survey result for the digital survey question.

2. The method of claim 1, wherein receiving the transcription of the verbal response of the respondent from the voice transcription service is based on the voice transcription service transcribing the verbal response received from the voice-capable device of the respondent.

3. The method of claim 1, further comprising identifying one or more survey question attributes of the digital survey question, wherein the one or more survey question attributes comprise one or more of a target audience, a question identifier, an answer format, or a survey identifier.

4. The method of claim 3, further comprising matching at least one natural language phrase to the one or more survey question attributes from the natural language phrase database.

5. The method of claim 3, further comprising identifying a target audience based on the one or more survey question attributes, wherein the respondent is a member of the target audience.

6. The method of claim 1, wherein the user-provided text is generated by transcribing a verbally spoken survey question spoken by a survey administrator of the survey administrator client device.

7. The method of claim 6, wherein determining the question type of the digital survey question further comprises determining speech elements of the verbally spoken survey question.

8. The method of claim 1, wherein analyzing the transcription of the verbal response to generate the survey result for the digital survey question comprises:
utilizing natural language processing to identify a key phrase within the transcription of the verbal response; and
determining the key phrase corresponds to the survey result from a set of possible survey results for the digital survey question.

9. A system comprising:
at least one processor; and
a non-transitory storage medium comprising instructions thereon that, when executed by the at least one processor, cause the system to:

receive, from a survey administrator client device, a digital survey question comprising user-provided text and corresponding to a digital survey to be administered to at least one respondent;

determine a question type of the digital survey question by analyzing user-provided text to identify key terms and a sentence structure that indicate the question type;

matching a natural language phrase to the question type by identifying a stored natural language phrase that corresponds to the question type from within a natural language phrase database, wherein the natural language phrase comprises conversational language corresponding to the question type of the digital survey question;

generate a modified digital survey question by combining the natural language phrase with one or more of the key terms identified from the user-provided text;

distribute the modified digital survey question to a respondent by sending the modified digital survey question to a voice transcription service, wherein sending the modified digital survey question to the voice transcription service causes the voice transcription service to convert the modified digital survey question into an audio survey question and provide the audio survey question to a voice-capable device of a respondent;

receive, from the voice transcription service and in relation to the audio survey question, a transcription of a verbal response of the respondent; and analyze the transcription of the verbal response to generate a survey result for the digital survey question.

10. The system of claim 9, further comprising instructions that, when executed by the at least one processor, cause the system to:
store the survey result in a digital survey database; and
upon receiving a request from the survey administrator client device, provide the survey result to the client device for presentation on the survey administrator client device.

11. The system of claim 10, wherein the instructions cause the system to analyze the transcription of the verbal response to generate a survey result by:
comparing a key word within the transcription of the verbal response to a set of potential survey results; and
identifying that the key word matches a potential survey result within the set of potential survey results to generate the survey result for the digital question.

12. A non-transitory computer readable medium comprising instructions that, when executed by at least one processor, cause a computer device to:
receive, from a survey administrator client device, a digital survey question comprising user-provided text and corresponding to a digital survey to be administered to at least one respondent;

determine a question type of the digital survey question by analyzing the user-provided text to identify key terms and a sentence structure that indicate the question type;

matching a natural language phrase to the question type by identifying a stored natural language phrase that corresponds to the question type from within a natural language phrase database, wherein the natural language phrase comprises conversational language corresponding to the question type of the digital survey question;

generate a modified digital survey question by combining the natural language phrase with one or more of the key terms identified from the user-provided text;

distribute the modified digital survey question to a respondent by sending the modified digital survey question to a voice transcription service, wherein sending the modified digital survey question to the voice transcription service causes the voice transcription service to convert the modified digital survey question into an audio survey question and provide the audio survey question to a voice-capable device of a respondent;

receive, from the voice transcription service and in relation to the audio survey question, a transcription of a verbal response of the respondent; and analyze the transcription of the verbal response to generate a survey result for the digital survey question.

13. The non-transitory computer readable medium of claim 12, wherein the instructions cause the computer device to:

receive the user-provided text as a transcription of a verbal survey question spoken by a survey administrator of the survey administrator client device; and determine the question type of the digital survey question by analyzing the transcription of the verbal survey question to identify speech elements within the transcription of the verbal survey question by utilizing a natural language processing algorithm.

14. The non-transitory computer readable medium of claim 12, further comprising instructions that, when executed by the at least one processor, cause the computer device to identify the respondent for the digital survey question by determining, based on the key terms of the user-provided text, an indication of a target audience comprising a plurality of respondents, wherein the respondent is from the plurality of respondents.

15. The non-transitory computer readable medium of claim 14, further comprising instructions that, when executed by the at least one processor, cause the computer device to administer the digital survey question to each respondent of the plurality of respondents within the target audience by causing the voice transcription service to generate and send an audio survey question to voice-enabled smart devices of the plurality of respondents.

16. The non-transitory computer readable medium of claim 12, further comprising instructions that, when executed by the at least one processor, cause the computer device to, based on the question type of the digital survey question, determine a result format for the digital survey question.

17. The non-transitory computer readable medium of claim 16, further comprising instructions that, when executed by the at least one processor, cause the computer device to:

analyze the transcription of the verbal response to identify response elements corresponding to the result format; and based on the response elements, generate the survey result according to the result format.

18. The non-transitory computer readable medium of claim 17, wherein the response elements comprise a key phrase identified within the transcription of the verbal response and that corresponds to a potential survey result of the result format.

19. The non-transitory computer readable medium of claim 18, further comprising instructions that, when executed by the at least one processor, cause the computer device to:

compare the key phrase to the potential survey result; and determine that the key phrase or a derivation of the key phrase matches the potential survey result.

20. The non-transitory computer readable medium of claim 12, further comprising instructions that, when executed by the at least one processor, cause the computer device to provide the survey results for audio delivery to the survey administrator client device.

* * * * *